United States Patent
Saunders et al.

(10) Patent No.: US 9,435,446 B1
(45) Date of Patent: Sep. 6, 2016

(54) ROTARY VALVE WITH BRAKE MODE

(71) Applicant: Google Inc., Mountain View, CA (US)

(72) Inventors: John Aaron Saunders, Arlington, MA (US); Steven D. Potter, Bedford, MA (US)

(73) Assignee: Google Inc., Mountain View, CA (US)

( * ) Notice: Subject to any disclaimer, the term of this patent is extended or adjusted under 35 U.S.C. 154(b) by 88 days.

(21) Appl. No.: 14/492,183

(22) Filed: Sep. 22, 2014

Related U.S. Application Data

(60) Provisional application No. 62/028,542, filed on Jul. 24, 2014.

(51) Int. Cl.
*F16K 31/04* (2006.01)
*F16K 11/085* (2006.01)
*F16K 11/06* (2006.01)

(52) U.S. Cl.
CPC ............. *F16K 11/06* (2013.01); *F16K 31/042* (2013.01); *F16K 11/0856* (2013.01); *Y10T 137/86646* (2015.04); *Y10T 137/86654* (2015.04); *Y10T 137/86662* (2015.04)

(58) Field of Classification Search
CPC .... F16K 11/06; F16K 11/072; F16K 11/076; F16K 31/041; Y10T 137/86646; Y10T 137/86654; Y10T 137/86662
See application file for complete search history.

(56) References Cited

U.S. PATENT DOCUMENTS

| | | | |
|---|---|---|---|
| 2,547,929 A * | 4/1951 | Dawson | F15B 13/04 137/625.23 |
| 2,675,679 A * | 4/1954 | Parker | F15B 13/04 137/624.27 |
| RE25,126 E * | 2/1962 | Charlson | B62D 5/097 137/625.24 |
| 3,199,539 A * | 8/1965 | Leathem | B30B 15/24 137/625.24 |
| 3,454,049 A * | 7/1969 | Hoos | F15B 13/04 137/625.23 |
| 3,774,634 A | 11/1973 | Bonney | |
| 4,140,953 A | 2/1979 | Dunne | |
| 4,199,007 A * | 4/1980 | Holmes | F16K 11/06 137/624.13 |
| 4,216,702 A | 8/1980 | Brundidge et al. | |
| 4,311,171 A * | 1/1982 | Roberts | B62D 5/083 137/625.23 |
| 4,800,924 A | 1/1989 | Johnson | |
| 4,804,016 A * | 2/1989 | Novacek | B62D 5/083 137/625.23 |
| 4,838,145 A * | 6/1989 | Slocum | F15B 13/07 137/625.23 |
| 4,858,650 A * | 8/1989 | Devaud | F15B 13/0402 137/625.22 |
| 5,020,417 A | 6/1991 | Weyer | |
| 5,263,512 A * | 11/1993 | Emori | B62D 5/0837 137/625.23 |
| 5,269,215 A * | 12/1993 | Phillips | B62D 5/083 137/625.23 |
| 5,467,800 A * | 11/1995 | Sallas | F15B 21/125 137/624.13 |
| 5,954,093 A | 9/1999 | Leonard | |

(Continued)

*Primary Examiner* — Marina Tietjen
*Assistant Examiner* — Seth W Mackay-Smith
(74) *Attorney, Agent, or Firm* — McDonnell Boehnen Hulbert & Berghoff LLP

(57) ABSTRACT

An example valve includes a sleeve having a plurality of openings configured along a length of the sleeve. A spool is rotatable within the sleeve and includes a respective plurality of openings along a length of the spool corresponding to the plurality of openings of the sleeve. A rotary actuator coupled to the spool is configured for rotating the spool within the sleeve. The rotary actuator can rotate the spool to a given rotary position in a clockwise or a counter-clockwise direction to cause at least a partial alignment between a subset of the respective plurality of openings of the spool and a subset of the plurality of openings of the sleeve.

19 Claims, 28 Drawing Sheets

(56) References Cited

U.S. PATENT DOCUMENTS

| | | | |
|---|---|---|---|
| 5,975,137 A * | 11/1999 | Strong | B62D 5/0837 137/625.23 |
| 6,269,838 B1 | 8/2001 | Woodworth et al. | |
| 6,594,992 B1 | 7/2003 | Naito et al. | |
| 7,322,375 B2 * | 1/2008 | Goldfarb | F16K 11/085 137/625.22 |
| 7,735,517 B2 | 6/2010 | Kerckhove et al. | |
| 9,127,694 B2 * | 9/2015 | Greeb | F15B 13/0406 |

* cited by examiner

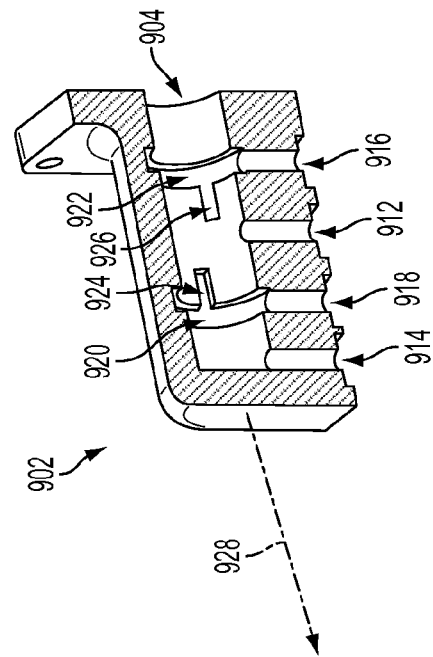
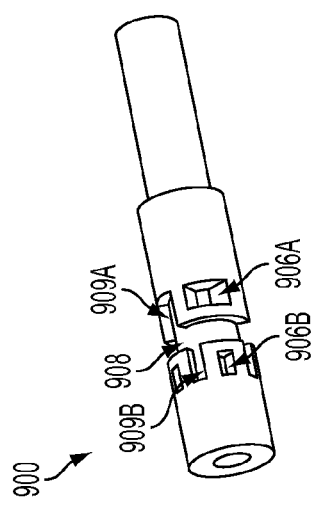
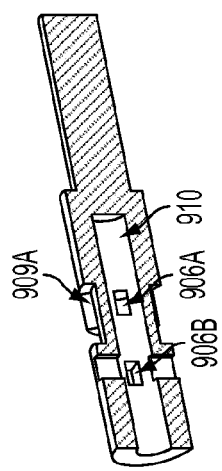
FIGURE 9C
FIGURE 9A
FIGURE 9B

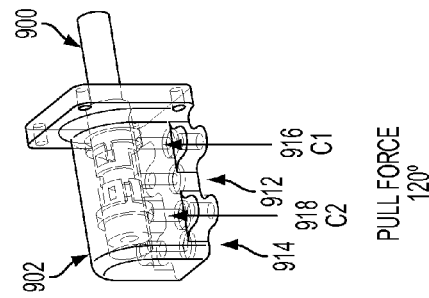
FIGURE 10C
FIGURE 10D
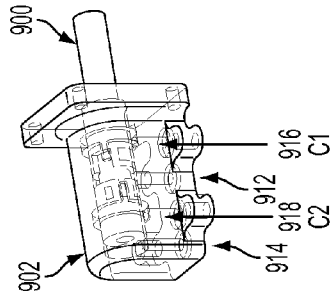
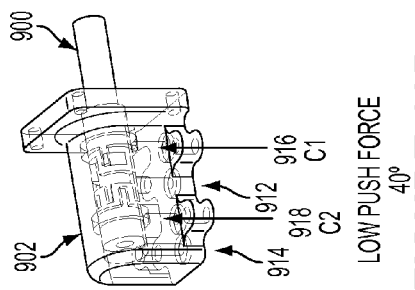
FIGURE 10A
FIGURE 10B
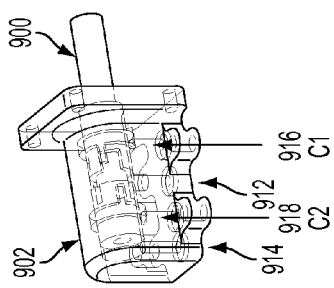

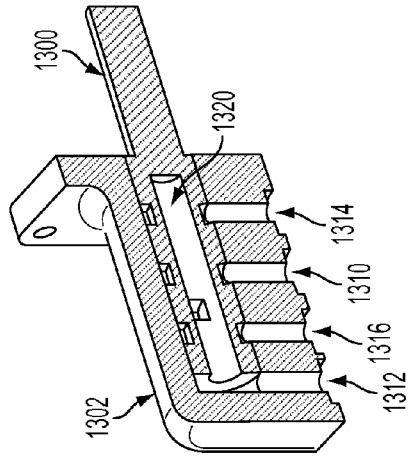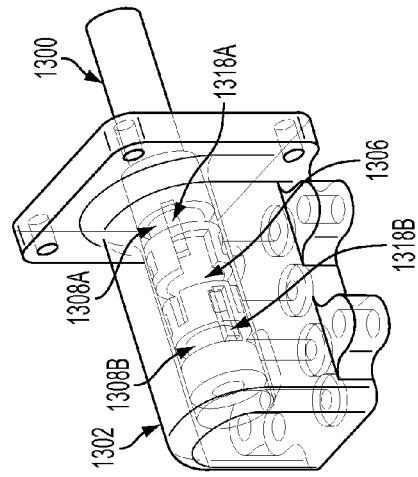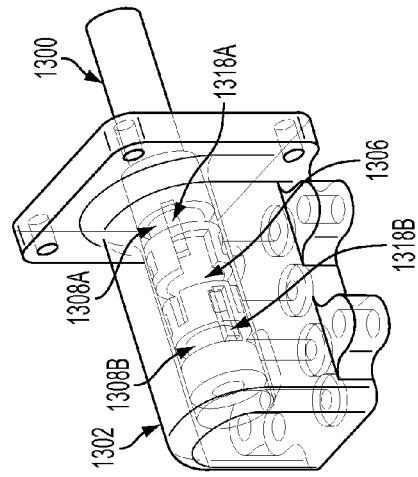

ROTARY VALVE WITH BRAKE MODE

CROSS REFERENCE TO RELATED APPLICATION

The present application claims priority to U.S. Provisional patent application Ser. No. 62/028,542, filed on Jul. 24, 2014, and entitled "Rotary Valve with Brake Mode," which is herein incorporated by reference as if fully set forth in this description.

BACKGROUND

Hydraulic systems may include an actuator that is powered by hydraulic fluid supplied from a hydraulic fluid source, such as a pump. A valve can be used to control hydraulic fluid flow to and from the actuator. For instance, the valve can control flow from the pump to the actuator and flow from the actuator to a tank or reservoir. The valve is controlled to vary the resistance to flow so as to control speed and direction of motion of the actuator.

SUMMARY

The present disclosure describes embodiments that relate to a rotary valve with brake mode. In one aspect, the present disclosure describes a hydraulic circuit. The hydraulic circuit includes a supply line for containing pressurized fluid; a return line including fluid having pressure lower than that of the pressurized fluid; a hydraulic actuator including a first chamber and a second chamber; and a valve. The valve includes a sleeve having a plurality of openings configured along a length of the sleeve, where the plurality of openings includes at least: a first opening configured to receive the pressurized fluid from the supply line, a second opening configured to communicate fluid to the return line, a third opening configured to communicate fluid to and from the first chamber of the hydraulic actuator, and a fourth opening configured to communicate fluid to and from the second chamber of the hydraulic actuator. The valve also includes a spool rotatable within the sleeve, where the spool includes a respective plurality of openings along a length of the spool corresponding to the plurality of openings of the sleeve. The valve further includes a rotary actuator coupled to the spool for rotating the spool within the sleeve in a clockwise or a counter-clockwise direction to cause at least a partial alignment between a subset of the respective plurality of openings of the spool and a subset of the plurality of openings of the sleeve so as to: (i) connect one of the first chamber and the second chamber of the hydraulic actuator to the supply line, and connect the other chamber to the return line, or (ii) connect both the first chamber and the second chamber of the hydraulic actuator to the return line.

In another aspect, the present disclosure describes a method. The method includes receiving at a controller a command to move a hydraulic actuator in a given direction at a given speed, where the hydraulic actuator includes a first chamber and a second chamber. The method also includes, in response to the command, the controller providing a signal to a valve to operate the valve. The valve comprises a sleeve having a plurality of openings configured along a length of the sleeve. The plurality of openings includes at least: a first opening configured to receive pressurized fluid from a supply line, a second opening configured to communicate fluid to a return line including fluid having pressure lower than that of the pressurized fluid, a third opening configured to communicate fluid to and from the first chamber of the hydraulic actuator, and a fourth opening configured to communicate fluid to and from the second chamber of the hydraulic actuator. The valve also comprises a spool rotatable within the sleeve, the spool including a respective plurality of openings along a length of the spool corresponding to the plurality of openings of the sleeve. The valve further comprises a rotary actuator coupled to the spool for rotating the spool within the sleeve. The rotary actuator operates to rotate the spool, based on the signal, to a given rotary position in a clockwise or a counter-clockwise direction to cause at least a partial alignment between a subset of the respective plurality of openings of the spool and a subset of the plurality of openings of the sleeve so as to: (i) connect one of the first chamber and the second chamber of the hydraulic actuator to the supply line, and connect the other chamber to the return line, or (ii) connect both the first chamber and the second chamber of the hydraulic actuator to the return line.

In still another aspect, the present disclosure describes a valve system. The valve system includes a sleeve having a plurality of openings configured along a length of the sleeve. The plurality of openings includes at least: a first opening configured to receive pressurized fluid from a supply port, a second opening configured to communicate fluid to a return port, a third opening configured to communicate fluid to and from a first chamber of a hydraulic actuator, and a fourth opening configured to communicate fluid to and from a second chamber of the hydraulic actuator. The valve system also includes a spool rotatable within the sleeve, the spool including a respective plurality of openings along a length of the spool corresponding to the plurality of openings of the sleeve. The valve system further includes a rotary actuator coupled to the spool for rotating the spool within the sleeve. The valve system also includes a controller for providing a signal to the rotary actuator to rotate the spool to a given rotary position in a clockwise or a counter-clockwise direction to cause at least a partial alignment between a subset of the respective plurality of openings of the spool and a subset of the plurality of openings of the sleeve so as to: (i) connect one of the first chamber and the second chamber of the hydraulic actuator to the supply line, and connect the other chamber to the return line, or (ii) connect both the first chamber and the second chamber of the hydraulic actuator to the return line.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 9A-9C illustrate a manifold-style four-way valve with annular and T-grooves on both a spool and a valve body having a cavity within which the spool is configured to rotate, in accordance with an example embodiment.

FIGS. 10A-10D illustrate a valve assembly for the valve illustrated in FIGS. 9A-9C with the spool disposed within the valve body at four respective rotary positions, in accordance with an example embodiment.

FIGS. 13A-13D illustrate a four-way valve with annular and T-grooves on a spool and axial grooves in a valve body within which the spool is configured to rotate, in accordance with an example embodiment.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

I. INTRODUCTION

A four-way hydraulic servo valve can be an electrically operated valve that controls how hydraulic fluid is ported to a hydraulic actuator. Servo valves may be operated by transforming a changing analog or digital input signal into a smooth set of movements in a hydraulic actuator.

Figure 1:
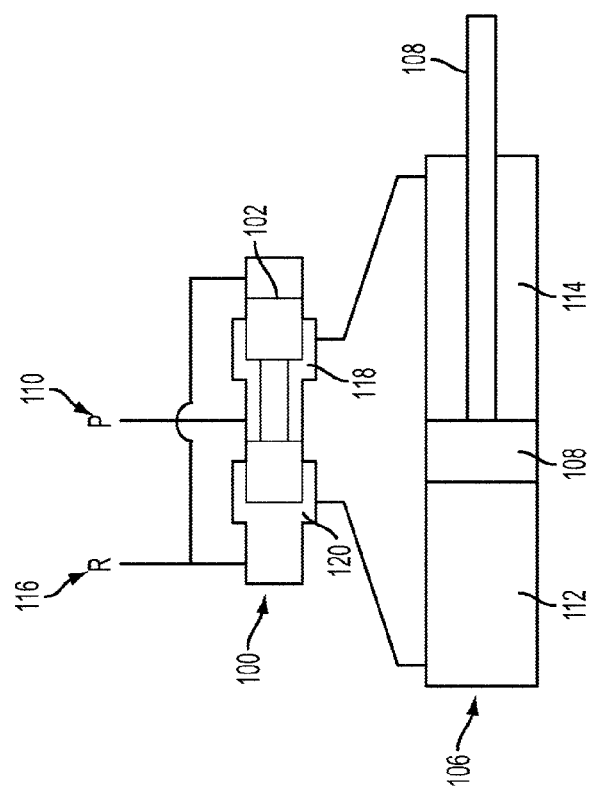
FIG. 1 illustrates a hydraulic circuit including a valve having a spool configured to move linearly, in accordance with an example embodiment.

FIG. 1 illustrates a hydraulic circuit including a valve 100 having a spool 102 configured to move linearly, in accordance with an example embodiment. FIG. 1 depicts the valve 100 controlling flow to and from a hydraulic actuator (or cylinder) 106 so as to control motion of a piston 108 of the hydraulic actuator 106. Axial position of the spool 102 controls flow from a pressure source 110 through a supply line to one of the two chambers 112 and 114 of the hydraulic actuator 106, and controls flow of fluid forced out from the other chamber to a low pressure reservoir or tank 116. For instance, as shown in FIG. 1, the spool 102 is shifted to a given linear position so as to allow flow from the pressure source 110 through opening 118 to the chamber 114, and allow fluid forced out from the chamber 112 through opening 120 to flow through a return line to the reservoir 116. An electric solenoid, a stepper motor, a hydraulic actuator, or any other actuation device may be used for moving the spool 102.

Thus, in response to moving the spool to the position shown in FIG. 1, the piston 108 may move (to the left). Respective sizes of the openings 118 and 120 depend on the axial position of the spool 102, i.e., the axial position the spool 102 determines an amount of flow through the valve 100 and the restriction that the flow is subjected to while passing through the valve 100. In this manner, the axial position of the spool 102 affects/controls the speed of motion of the piston 108.

Spools of four-way directional valves, such as the spool 102, can be relatively heavy, which negatively affects (i.e., increases) response time of the valve 100 (i.e., the amount of time it takes the spool 102 to respond to a command to move to a particular position). Further, to include other modes of operation such as brake or regenerative modes where both chambers 112 and 114 of the hydraulic actuator 106 are connected together through either the supply line or the return line, a length of the spool 102 may be increased. An increase of the length of the spool 102 may cause a size of the valve 100 to increase, and may further affect (e.g., further increase) the response time of the valve 100.

Further, the valve 100 can be inefficient as the valve 100 may consume high-pressure hydraulic fluid when the hydraulic actuator 106 performs negative work (e.g., lowering a weight with gravity assistance). Also, in some examples, the valve 100 may include a first stage hydraulic amplifier (not shown) configured to move the spool 102. This first stage may consume significant hydraulic power even when the valve 100 is closed. In other examples, instead of using a first stage, the valve 100 may be directly driven by a solenoid or other electromagnetic devices to move the spool 102. However, such solenoid or electromagnetic devices may be large and heavy.

II. EXAMPLE ROTARY VALVE

In some examples, response time and efficiency for a valve can be enhanced using a compact rotary valve having a spool that is rotatable as opposed to a spool that moves in a linear manner.

Figure 2A:
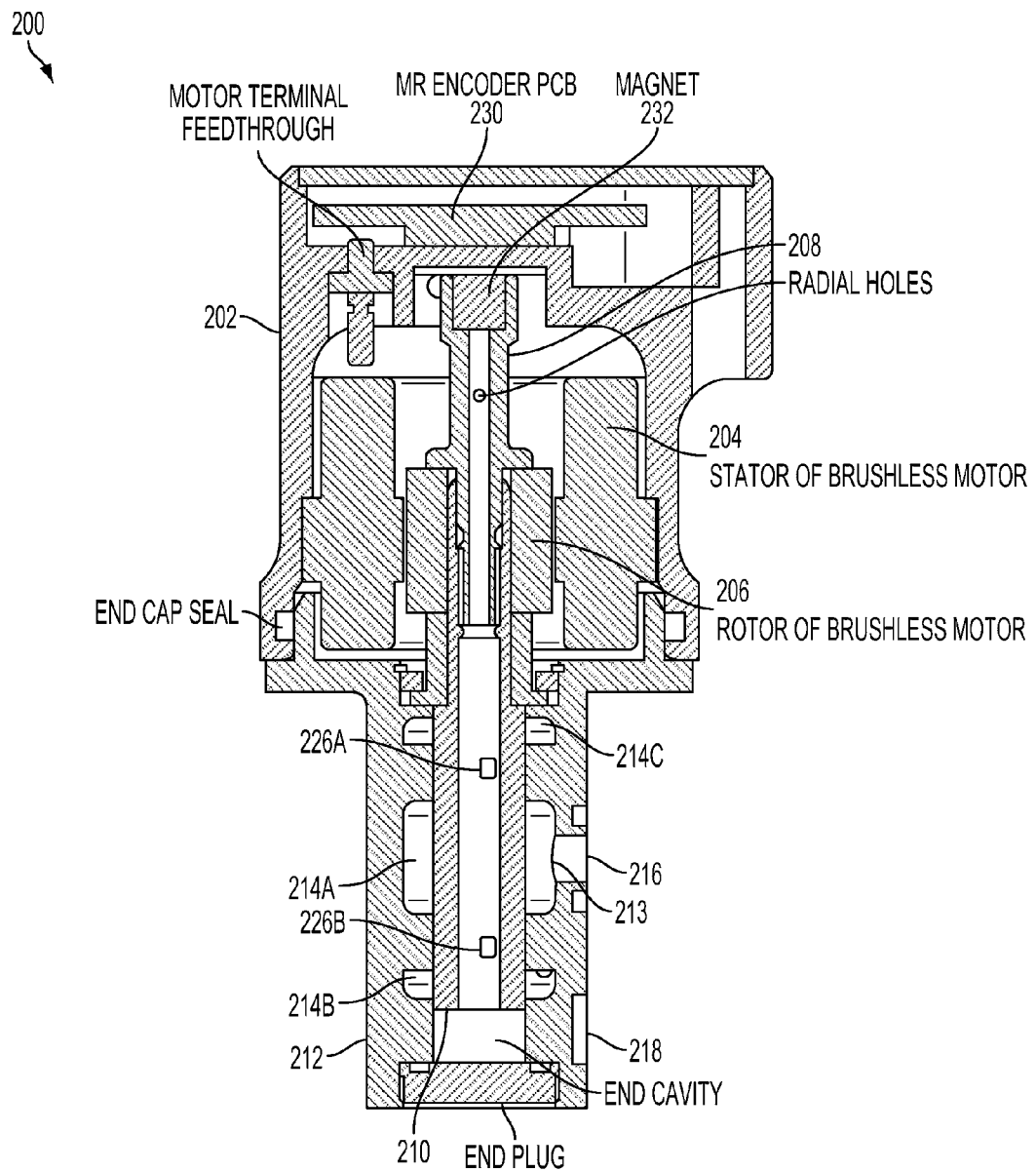
FIG. 2A illustrates a cross section of a rotary valve, in accordance with an example embodiment.

FIG. 2A illustrates a cross section of a rotary valve 200, in accordance with an example embodiment. The valve 200 is a manifold style four-way valve. The rotary valve 200 may include a housing or end cap 202 that houses a rotary actuator such as a brushless direct current (DC) motor including a stator 204 and a rotor 206. A rotor bolt 208 is coupled to and configured to rotate with the rotor 206. A spool 210 is coupled to and configured to rotate with the rotor 206.

The spool 210 is rotatable within a valve body or sleeve 212. "Valve body" and "Sleeve" are used interchangeably herein. The sleeve 212 may have a plurality of openings such as opening 213 configured along a length of the sleeve 212. The openings may be disposed in annular grooves such as annular grooves 214A, 214B, and 214C. The openings may be arranged axially along the sleeve 212.

Figure 2B:
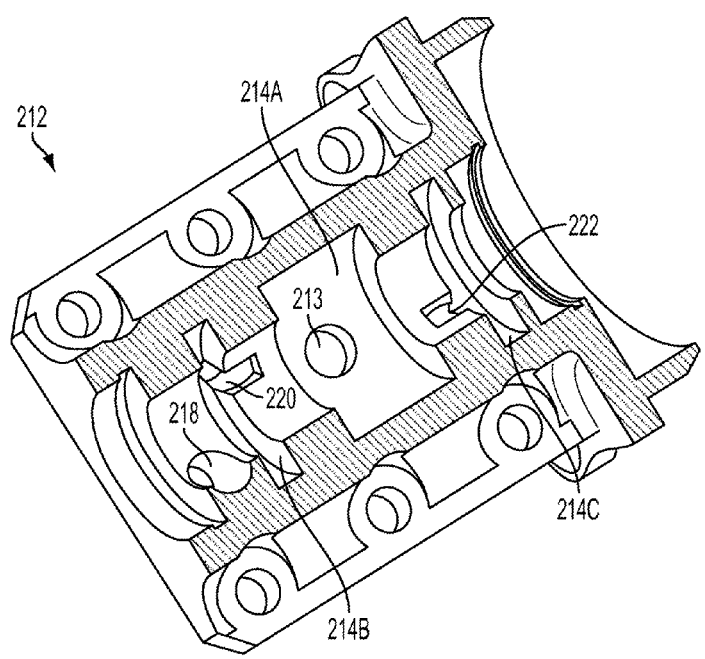
FIG. 2B illustrates a cross section of a valve body or sleeve of the valve illustrated in FIG. 2A, in accordance with an example embodiment.

FIG. 2B illustrates a cross section of the valve body or sleeve 212, in accordance with an example embodiment. As shown in FIG. 2B, the sleeve 212 may include the opening 213 associated with the annular groove 214A. The opening 213 may be configured to receive pressurized fluid from a supply line at a port 216 shown in FIG. 2A. The sleeve 212 may also include a return port 218. The return port 218 may be configured to communicate fluid through the return port 218 to a low pressure reservoir or tank. The sleeve 212 may further include an opening 220 configured to communicate fluid through the annular groove 214B to and from a first chamber (C1) of a hydraulic actuator. The sleeve 212 may further include an opening 222 configured to communicate fluid through the annular groove 214C to and from a second chamber (C2) of the hydraulic actuator. The openings 220 and 222 may be referred to as T-slots because they form T-shaped openings with the annular grooves 214B and 214C, respectively. The opening 220 may have a corresponding opening on the other side of the sleeve 212, and the opening 222 may have a corresponding opening on the other side of the sleeve 212. In this manner, the openings 220 and 222 and their corresponding openings form an array of openings that balances radial pressure forces acting on the spool 210, and thus minimizes friction that the spool 210 experiences as the spool 210 rotates within the sleeve 212. In one example, the openings 220 and 222 and the corresponding openings may be 180° opposed. In another example, three openings may be disposed along the circumference of the spool 210 space 120° apart from each other. Other examples are possible. Reference herein to one of these openings (e.g., the opening 220 or 222) includes reference the opening and the corresponding opening on the other side of the sleeve 212.

The spool 210 shown in FIG. 2A may include a respective plurality of openings along a length of the spool 210 corresponding to the plurality of openings of the sleeve 212.

Figure 2C:
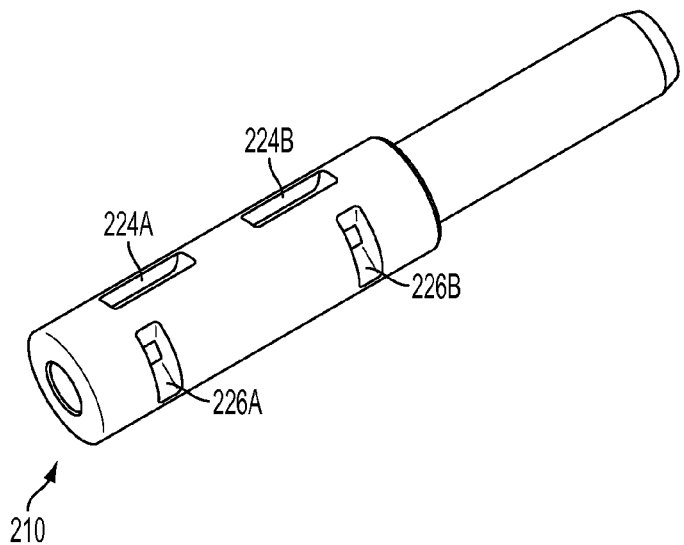
FIG. 2C illustrates a spool of the valve illustrated in FIG. 2A, in accordance with an example embodiment.

FIG. 2C illustrates the spool 210, in accordance with an example embodiment. As shown in FIG. 2C, the spool 210 could be hollow, and may have openings such as axial grooves 224A and 224B and windows 226A and 226B. The spool 210 may also include axial grooves and windows on the other side of the spool 210 that is not shown in FIG. 2C.

For example, the spool 210 may include windows corresponding to the windows 226A and 226B and located at an opposite side (e.g., 180° apart not shown in FIG. 2C) of the spool 210 from the windows 226A and 226B. In examples, multiple windows such as the windows 226A and 226B may be disposed along the circumference of the spool 210. For example, N windows such as the window 226A may be disposed along the circumference of the spool 210 spaced 360°/N apart from each other. Also, the spool 210 may include axial grooves corresponding to the axial grooves 224A and 224B and located at an opposite side of the spool 210 from the axial grooves 224A and 224B. Having axial grooves and windows in such arrangement may help balance forces applied on the spool 210 by hydraulic fluid during operation of the valve 200. Reference herein to a window of the windows 226A and 226B includes reference to the window 226A or 226B shown in FIG. 2C and the corresponding window (or array of windows disposed along the circumference of the spool 210, i.e., disposed in a circular manner about a longitudinal axis of the spool) on the other side of the spool 210 not shown in FIG. 2C. For instance, reference to the window 226A includes reference to the window 226A and the corresponding window on the other side of the spool 210 that is not shown in FIG. 2C. Similarly, reference herein to an axial groove of the axial grooves 224A and 224B includes reference to the axial groove 224A or 224B and the corresponding axial groove on the other side of the spool 210.

The rotary actuator (e.g., motor) coupled to the spool 210 may be configured to rotate the spool 210 within the sleeve 212 in a clockwise or a counter-clockwise direction. Rotating the spool 210 to a given position or angle may cause at least a partial alignment between the grooves and windows of the spool 210 with the openings (e.g., the annular groove 214A and the T-slots 220 and 222) of the sleeve 212.

Figure 2D:
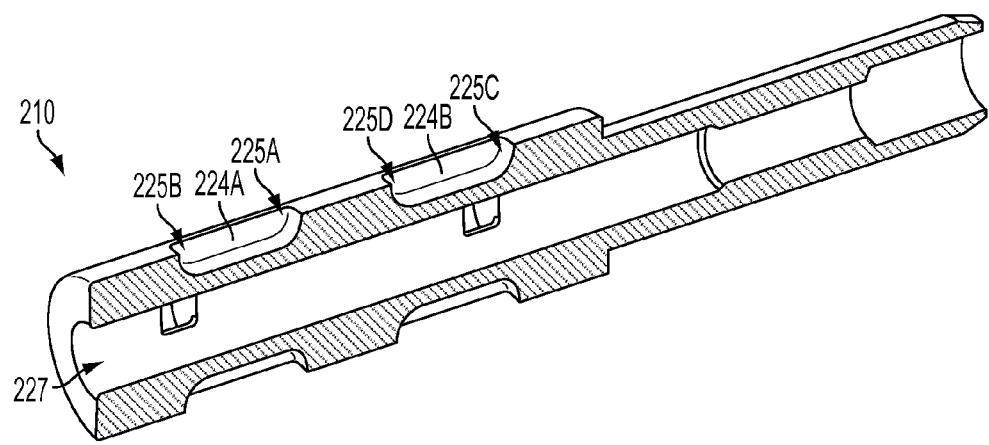
FIG. 2D illustrates a cross section of the spool illustrated in FIG. 2C, in accordance with an example embodiment.

FIG. 2D illustrates a cross section of the spool 210, in accordance with an example embodiment. The spool 210 is hollow and has inner chamber 227. As shown in FIG. 2D, the axial grooves 224A and 224B are not through-holes and do not reach the inner chamber 227 of the spool 210. The axial groove 224A has a first end 225A and a second end 225B, and the axial groove 224B has a first end 225C and a second end 225D. The groove 214A (shown in FIGS. 2A and 2B) overlaps the first end 225A of the axial groove 224A, and overlaps the second end 225D of the axial groove 224B. In this configuration, the axial grooves 224A and 224B contain, or have access to, pressurized fluid received through the opening 213 and the groove 214A in the sleeve 212.

Figure 2E:
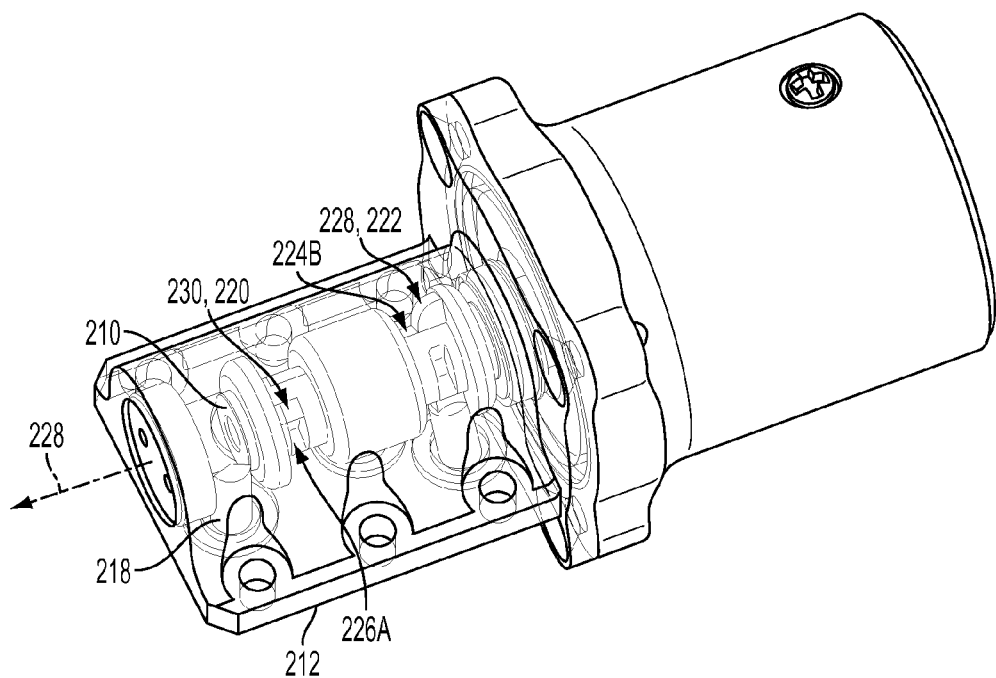
FIG. 2E illustrates the valve illustrated in FIGS. 2A-2D with the valve body made transparent, and while the spool is in a first rotary position/angle, in accordance with an example embodiment, in accordance with an example embodiment.

FIG. 2E illustrates the valve 200 while the spool 210 is in a first rotary position/angle, in accordance with an example embodiment. The valve body or sleeve 212 is transparent in FIG. 2E to illustrate the details of the spool 210 and the sleeve 212.

In the first rotary position, fluid received from the supply line through the port 216 and the groove 214A in the sleeve 212 is communicated to the axial grooves 224A (specifically, the first end 225A) and 224B (specifically, the second end 225D). While the spool 210 is in the first rotary position, the first end 225C of the axial groove 224B may be aligned, at least partially, with a T-slot 222 in the sleeve 212. The fluid is thus communicated through the T-slot 222 through the annular groove 214C to the chamber C2 of the hydraulic actuator to push a piston of the hydraulic actuator. Further, at the first rotary position of the spool 210, fluid that is forced out of the first chamber C1 is communicated through T-slot 220 in the sleeve 212, which may be at least partially aligned with the window 226A in the spool. Fluid going through the window 226A is communicated through the inner chamber 227 of the spool 210, through the return port 218 (shown in FIG. 2B) of the sleeve 212, and through the return port 218 to the reservoir or tank.

In examples, hydraulic fluid from return line may be communicated to end cavity 234 shown in FIG. 2A. The end cap 202 may also be flooded with fluid from the return line. In this manner, the axial pressure forces acting on the spool 210 are balanced, and the pressure in the end cap 202 is minimized.

Figure 3A:
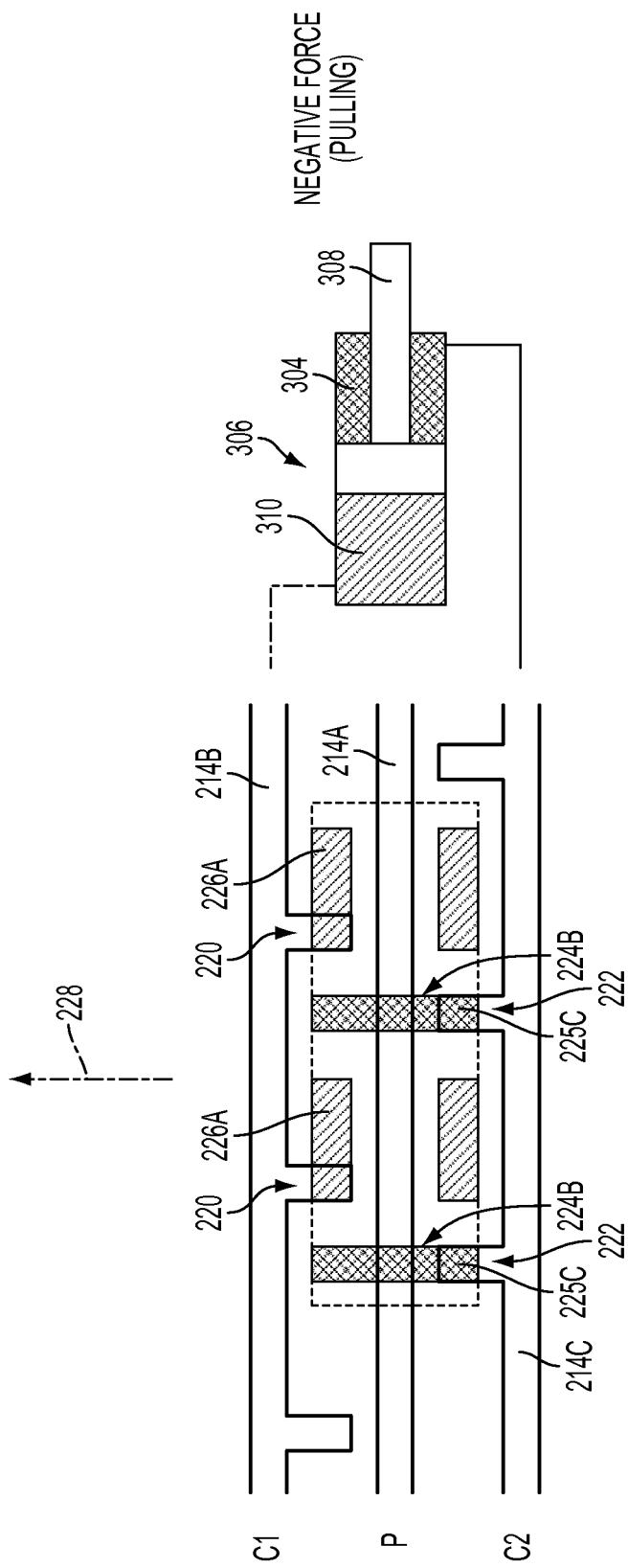
FIG. 3A illustrates a schematic of a hydraulic circuit where the spool is in a first rotary position, in accordance with an example embodiment.

FIG. 3A illustrates a schematic of a hydraulic circuit where the spool 210 is in the first rotary position, in accordance with an example embodiment. FIG. 3A depicts the spool 210 and the valve body or sleeve 210 as if the spool 210 and the sleeve 212 were unwrapped along a longitudinal axis 228 to obtain a planar view.

The schematic in FIG. 3A corresponds to operation of the valve 200 as depicted in FIG. 2E. High pressure fluid received from the supply line through the port 216 and the groove 214A in the sleeve 212 is communicated to the axial groove 224B and a corresponding axial groove on the other side of the spool 210 not depicted in FIGS. 2C and 2D. As mentioned above, reference to the axial groove 224B herein includes reference to both the axial groove 224B and the corresponding axial groove on the other side of the spool 210. While the spool 210 is in the first rotary position, the first end 225C of the axial groove 224B may be aligned, at least partially, with the T-slot 222 in the sleeve 212. The fluid is thus communicated through the T-slot 222 to a chamber 304 (C2) of a hydraulic actuator 306 to push a piston 308 of the hydraulic actuator 306. Further, at the first rotary position of the spool 210, fluid that is forced out of chamber 310 (C1) is communicated through the T-slot 220 in the sleeve 212, which may be at least partially aligned with the window 226A of the spool 210. FIG. 3A shows two windows 226A because, as mentioned above, the spool 210 may be symmetric, and thus there is a window that corresponds to the window 226A on the other side of the spool. Both windows are referred to by the window 226A. Fluid going through the window 226A is communicated through the inner chamber 227 of the spool 210, through the return port 218, and through the return port 218 to the reservoir or tank as described above with respect to FIG. 2E. Thus, the spool 210 being in this first rotary position causes a negative force to be applied on the piston 308 to pull the piston 308 such that the chamber 310 is contracting and the chamber 304 is expanding.

Figure 3B:
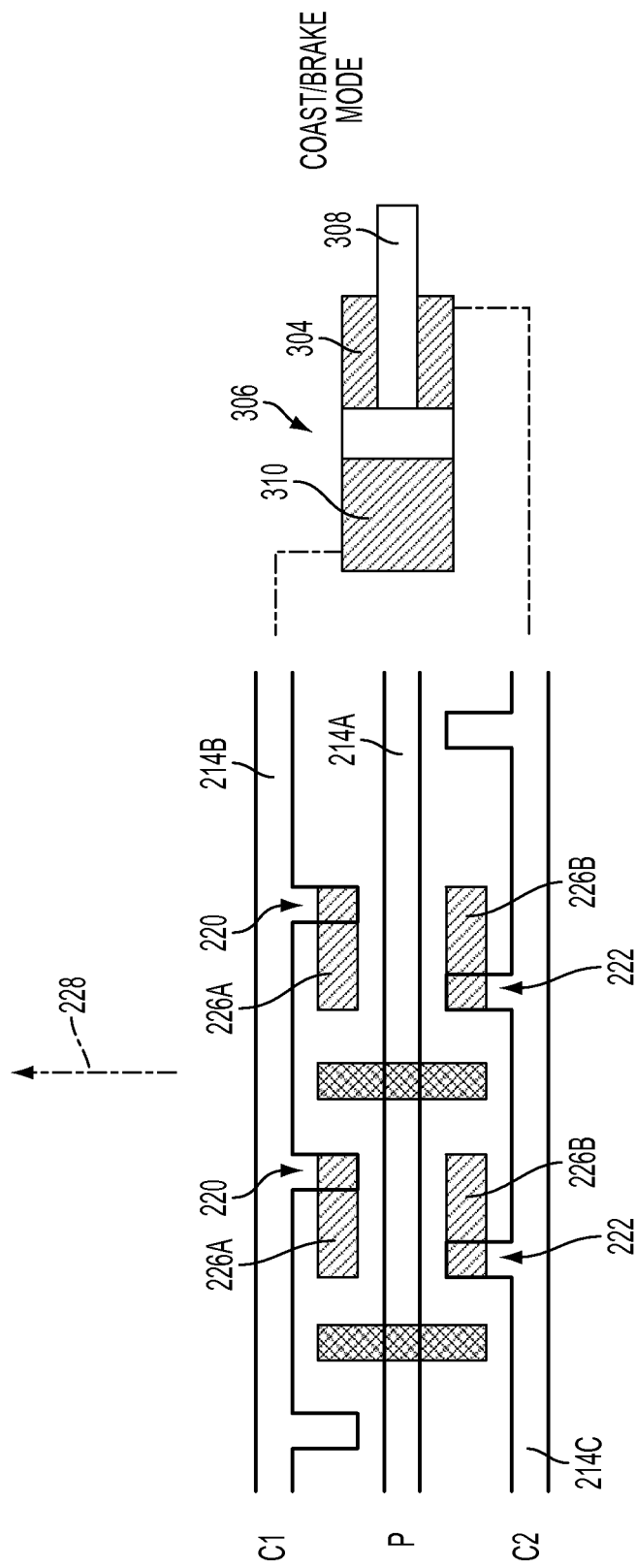
FIG. 3B illustrates a schematic of a hydraulic circuit while the spool is in a second rotary position, in accordance with an example embodiment.

FIG. 3B illustrates a schematic of a hydraulic circuit while the spool 210 is in a second rotary position, in accordance with an example embodiment. Rotating the spool 210 to the second position may cause both the chamber 304 and the chamber 310 of the hydraulic actuator 306 to be connected to the return line. In this case, the hydraulic actuator 306 is in a brake or coast mode.

As illustrated in FIG. 3B, high pressure fluid received from the supply line through the opening 213 and the groove 214A in the sleeve 212 is blocked because the axial grooves 224A and 224B (and the corresponding axial grooves on the other side of the spool 210) do not overlap, i.e., are not aligned with, any of the T-slots of the sleeve 212. However, the window 226A of the spool 210 overlaps or is, at least partially, aligned with the T-slot 220 of the sleeve 212. Also, the window 226B is aligned with the T-slot 222 in the sleeve 212. In this manner, both chambers 304 and 310 are connected to the return line or to the tank/reservoir having fluid at a low pressure. When the hydraulic actuator 306 operates in this brake or coast mode, fluid may be drained from one cylinder chamber to tank and fluid is supplied from the tank to the other chamber. This coast or brake mode can be implemented while the piston 308 is extending or retracting. The brake mode is generally used when the external force applied to the actuator 306 is in the same direction as the direction of movement of the piston 308. For instance, the piston 308 may be retracting (moving left in FIG. 3B) and is being assisted with gravity. In this case, high pressure fluid may not be needed to move the piston 308. Even though fluid is not supplied from the high pressure supply line, fluid is supplied from the tank through the return line.

Figure 3C:
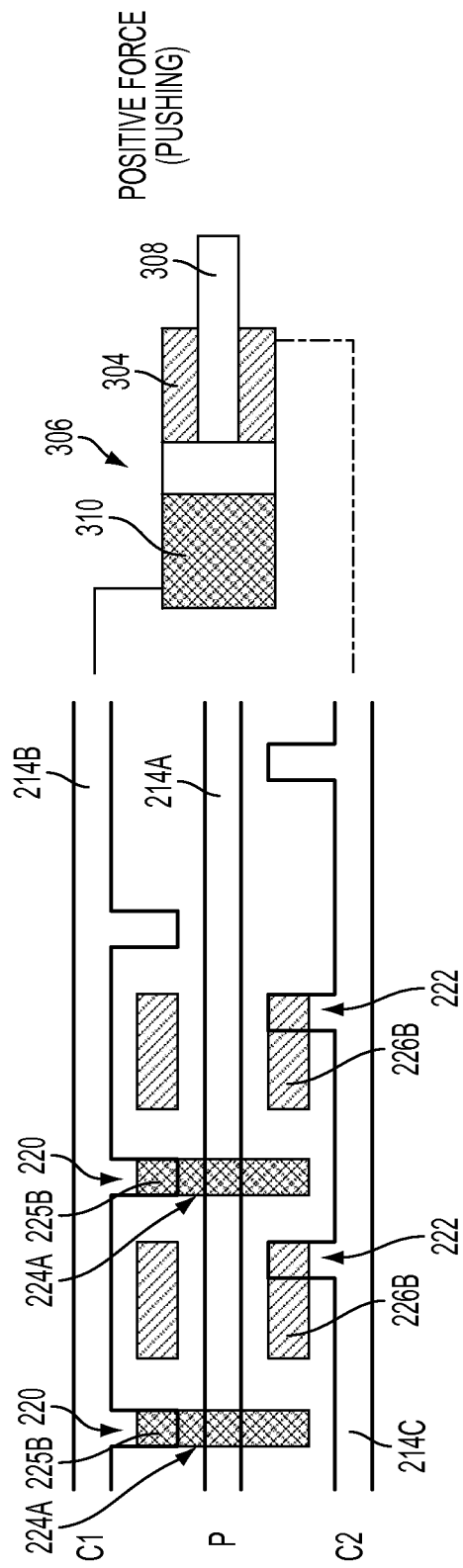
FIG. 3C illustrates a schematic of a hydraulic circuit while the spool is in a third rotary position, in accordance with an example embodiment.

FIG. 3C illustrates a schematic of a hydraulic circuit while the spool 210 is in a third rotary position, in accordance with an example embodiment. As illustrated in FIG. 3C, high pressure fluid received from the supply line through the opening 213 and the groove 214A in the sleeve 212 is communicated to the axial groove 224A. While the spool 210 is in the third rotary position, the first end 225B of the axial groove 224A may be aligned, at least partially, with the T-slot 220 in the sleeve 212. The fluid is thus communicated through the T-slot 220 to chamber 310 (C1) of the hydraulic actuator 306 to push the piston 308 of the hydraulic actuator 306 (to the right in FIG. 3C). Further, at the third rotary position of the spool 210, fluid that is forced out of chamber 304 (C2) is communicated through T-slot 222 in the sleeve 212, which may be at least partially aligned with the window 226B. Fluid going through the window 226B is communicated through the inner chamber 227 of the spool 210, through the return port 218, and through the return port 218 to the reservoir or tank. Thus, the spool 210 being in this third rotary position causes a positive force to be applied on the piston 308 and pushes the piston 308 such that the chamber 310 is expanding and the chamber 304 is contracting.

In this manner, the rotary actuator may be configured to enable 360° rotation of the spool to any given position to selectively align a subset of openings of the openings (e.g., axial grooves or windows) of the spool 210 with a subset of openings (e.g., T-slots) of the sleeve 212. Based on the position of the spool 210 and which openings are aligned, the hydraulic actuator 306 may operate in a particular mode (e.g., applying positive force mode, brake mode, negative force mode, etc.).

Also, based on the position of the spool, an or amount of alignment (e.g., no alignment, partial alignment, full alignment, etc.) between the openings of the spool 210 and the openings of the sleeve 212 may be changed so as to meter fluid passing through aligned openings. By metering the fluid, motion of the hydraulic actuator 306 (speed, force, etc.) could be controlled. For instance, a controller that may be included in the valve 200 or remote from the valve 200, may receive a command to move the piston 308 at a given speed in a given direction. The controller, in response, may provide a signal to the rotary actuator to rotate the spool 210 to a given position to control flow of fluid to and from the actuator 306 and thus control speed and direction of motion of the piston 308.

Referring back to FIG. 2A, in examples, a rotary position sensor 230, with associated electronics on a printed circuit board (PCB), may be coupled to the spool 210, and may provide information indicative of the rotary position of the spool 210 within the sleeve 212 to the controller. The controller may be configured to use the information to accurately control the position of the spool 210 within the sleeve 212, e.g., via closed loop feedback control. In an example, the rotary position sensor may include a magnetic rotary encoder that senses position of a magnet 232 coupled to the rotor bolt 208, which is coupled to the spool 210, so as to determine a rotary position of the spool 210. A magnetic rotary encoder is used herein as an example for illustration only. Other rotary position sensor technologies could be used.

Figure 4:
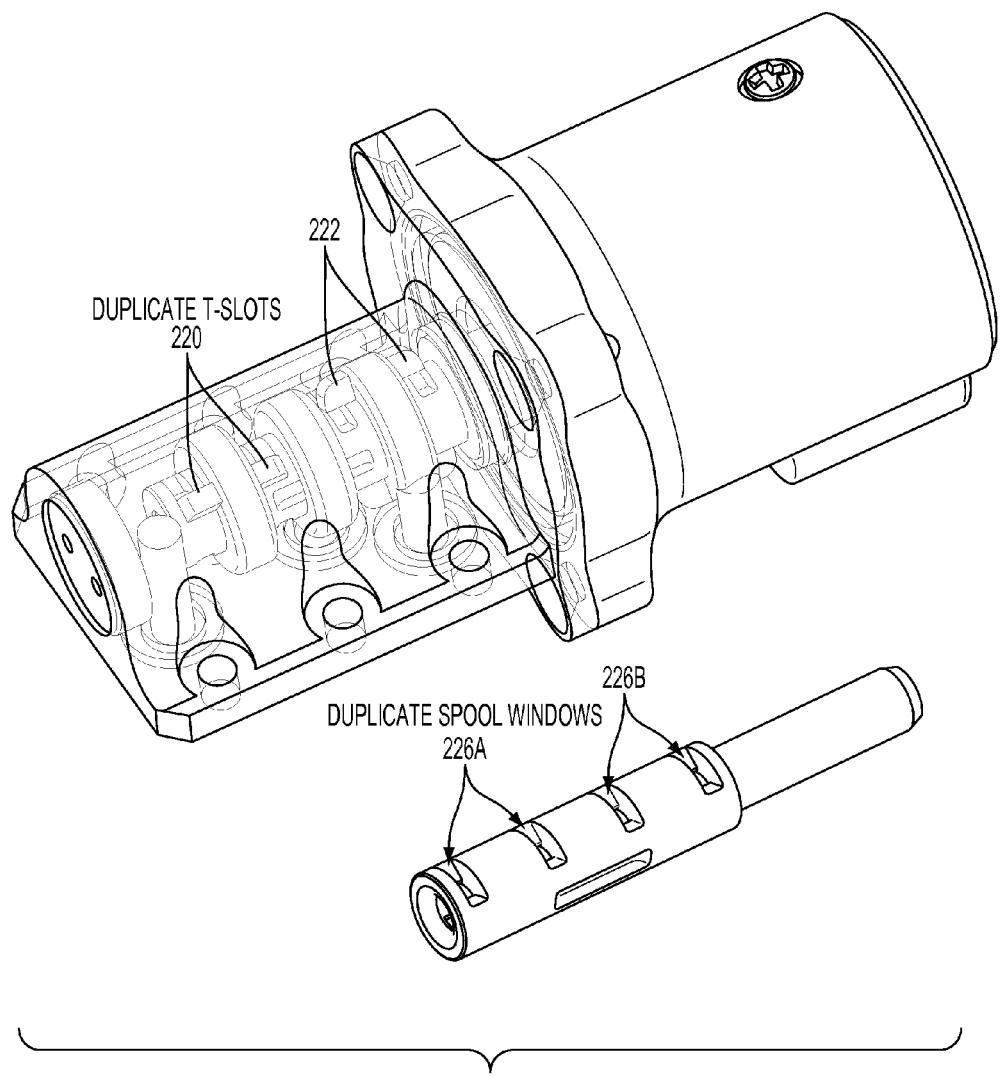
FIG. 4 illustrates a valve with duplicate openings, in accordance with an example embodiment.

FIG. 4 illustrates the valve 200 with duplicate openings, in accordance with an example embodiment. In some examples, it is advantageous to reduce the flow restriction to avoid cavitation. For instance, as shown in FIG. 4, when the valve 200 controls the hydraulic actuator 306 in a coast/brake mode, one of the chambers 304 or 310 of the actuator 306 draws fluid from the return line/tank, and reducing flow restriction may decrease the probability of cavitating the chamber that is drawing the fluid. FIG. 4 illustrates duplicating the number of windows such as the windows 226A and 226B to increase the flow area, i.e., reduce flow restriction. As illustrated in FIG. 4, the T-slots 220 and 222 are also duplicated to correspond to the duplication of the windows 226B and 226A, respectively. In this manner, the flow area is doubled and the flow restriction is decreased while the actuator 306 operates in brake mode and draws fluid from the tank. As mentioned above, the two windows 226B shown in FIG. 4 have corresponding two windows (or array of windows) on the other side of the spool 210. The windows 226A similarly have corresponding windows on the other side of the spool 210. Also, the T-slots 220 and 222 have corresponding T-slots (or array of slots) on the other side of the sleeve 212.

III. EXAMPLE VALVE CONFIGURATIONS

The valve 200 illustrated and described in FIGS. 2A-4 is a manifold-style four-way valve having a hollow spool and annular grooves in the valve body or sleeve. Such configuration is one example to implement the valve functionality described above. Other valve configurations are also possible as described in the examples shown in FIGS. 5A-13D.

Figure 5C:
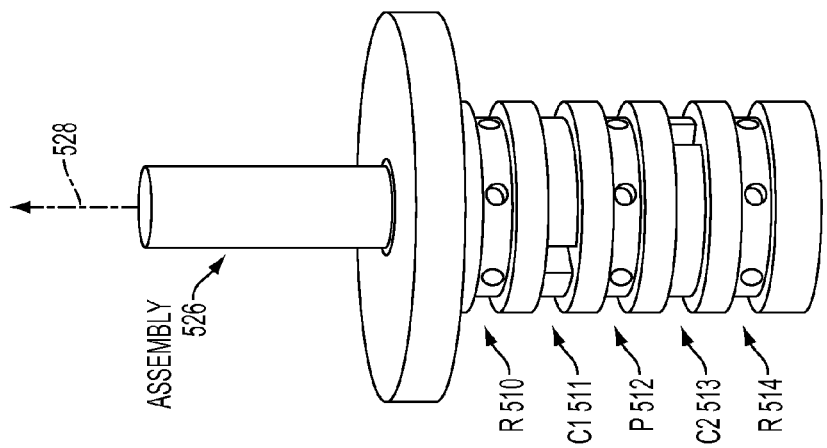
FIGS. 5A-5C illustrate a cartridge-style four-way valve, in accordance with an example embodiment.
Figure 5B:
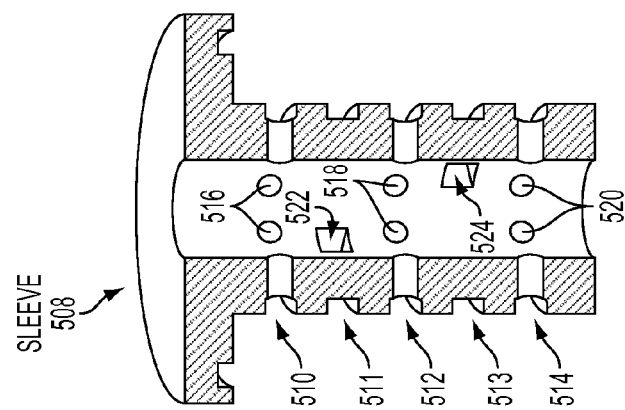
Figure 5A:
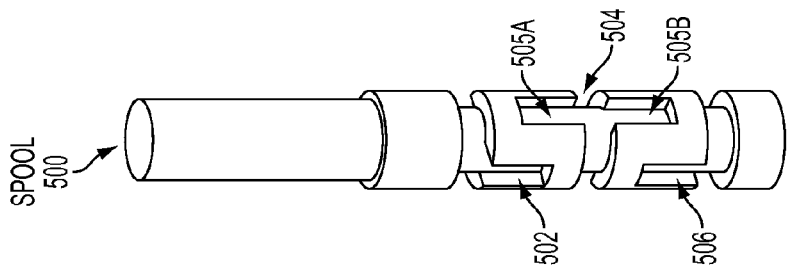

FIGS. 5A-5C illustrate a cartridge-style four-way valve, in accordance with an example embodiment. The cartridge-style valve can be a screw-in or slip-in cartridge valve that is integrated into manifolds with different functionalities.

FIG. 5A illustrates a spool 500 having grooves such as grooves 502, 504, and 506. The groove 504 has end portions 505A and 505B. The spool 500 is rotatable within a sleeve 508 illustrated in FIG. 5B. The sleeve 508 includes grooves such as grooves 510, 511, 512, 513, and 514. The sleeve 508 also includes holes such as the holes 516, 518, and 520 configured to communicate fluid between the grooves 510, 512, and 514 of the sleeve 508 and the grooves 502, 504, and 506 of the spool 500. The sleeve 508 further includes port windows such as port windows 522 and 524 to communicate fluid to and from chambers C1 and C2 of a hydraulic actuator, respectively.

The spool 500 and the sleeve 508 may be symmetric, and the other side of the spool 500 has grooves and end portions corresponding to the grooves 502, 504, and 506, and the end portions 505A and 505B. Similarly, the other side of the sleeve 508 may include holes corresponding to the holes 516, and holes 518, and the holes 520. The other side of the sleeve 508 may also include windows corresponding to the windows 522 and 524. Reference herein to any of the holes, grooves, and windows include reference to the particular hole, groove and window and the corresponding hole, groove, and window on the other side of the spool 500 and the sleeve 508.

FIG. 5C illustrates an assembled cartridge valve 526, in accordance with an example embodiment. FIG. 5C illustrates the spool 500 inside the sleeve 508, and shows that the grooves 510 and 514 are associated with a low pressure return line port, the groove 511 is associated with a chamber C1 port, the groove 512 is associated with a high pressure supply line port, and the groove 513 is associated with a chamber C2 port. Correspondingly, the grooves 502 and 506 of the spool 500 are associated with the low pressure return line, and the groove 504 is associated with a high pressure supply line.

Rotary position of the spool 500 with the sleeve 508 determines alignment of the grooves 502, 504, and 506 of the spool 500 with the windows 522 and 524. High pressure fluid is communicated from the supply line through the groove 512 and holes 518 of the sleeve 508 to the groove 504 of the spool 500. Rotary position of the spool 500 within the sleeve 212 determines whether: (i) end portion 505A is aligned with the window 522, (ii) the end portion 505B is aligned with the window 524, or (iii) high pressure fluid is blocked because none of the end portions 505A or 505B is aligned with a respective window in the sleeve 508. Similarly, based on the rotary position of the spool 500 within the sleeve 508, fluid forced out of a chamber of the hydraulic actuator may flow either through the window 522, the groove 502, the holes 516, and the groove 510 to tank, or through the window 524, the groove 506, the holes 520, and the groove 514 to return line/reservoir. In this manner, rotary position of the spool 500 within the sleeve 508 determines mode of operation of the hydraulic actuator (e.g., whether the actuator is in a positive force pushing, negative force pulling, coast mode, etc.).

Figure 6A:
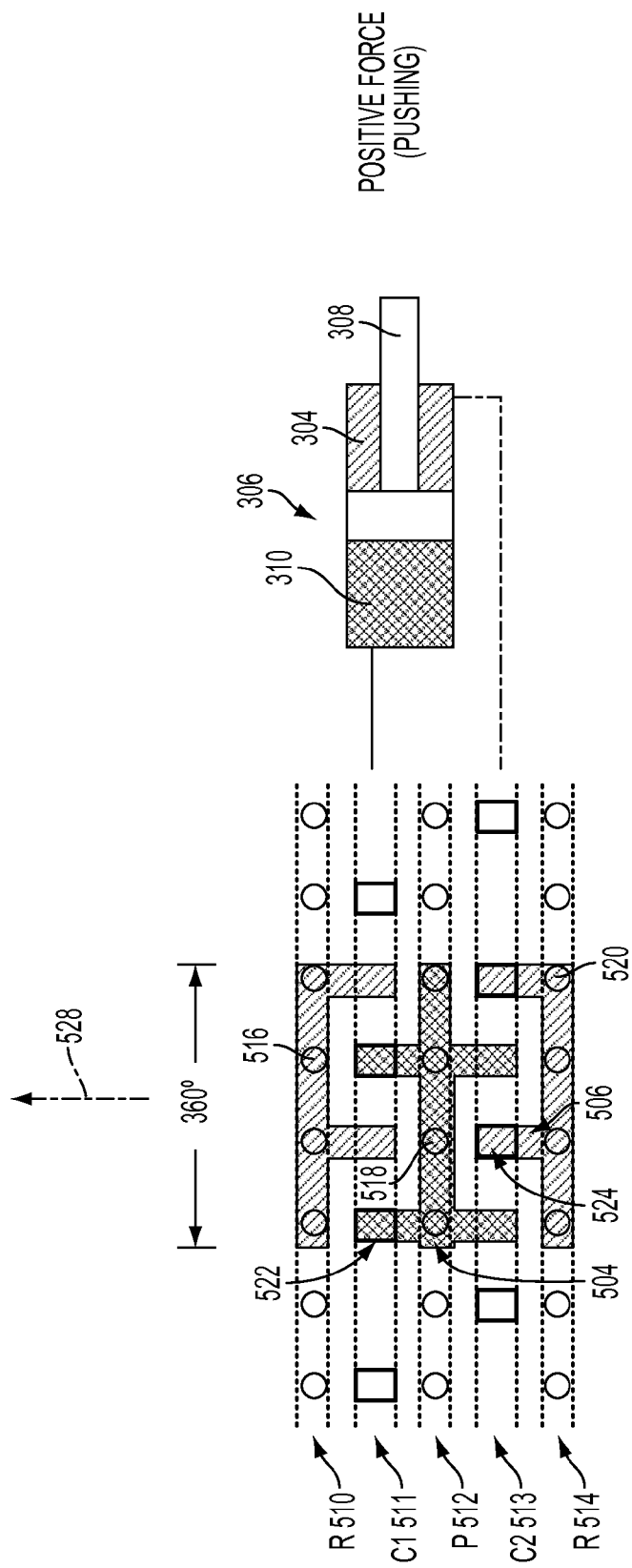
FIG. 6A illustrates a schematic of a hydraulic circuit while a spool of the cartridge-style four-way valve is in a first rotary position within a sleeve of the cartridge-style four-way valve, in accordance with an example embodiment.

FIG. 6A illustrates a schematic of a hydraulic circuit while the spool 500 is in a first rotary position within the sleeve 508, in accordance with an example embodiment. FIG. 6A depicts the spool 500 and the sleeve 508 as if the spool 500 and the sleeve 508 were unwrapped along a longitudinal axis 528 to obtain a planar view.

In the first rotary position, the spool groove 504 (specifically, the end portion 505A and the corresponding end portion on the other side of the spool 500) is, at least partially, aligned with the window 522. Thus, high pressure fluid flows through the groove 512, the holes 518, the window 522, the groove 511, to the chamber 310 of the hydraulic actuator 306. Consequently, the chamber 310 expands, the piston 308 is pushed outwardly (to the right in FIG. 6A), and the chamber 304 contracts.

Also, in the first rotary position, the spool groove 506 is at least partially aligned with the window 524. Thus, fluid forced out of the chamber 304 flows through the groove 513, the window 524, the groove 506, the holes 520, the groove 514 to the return line and leading to the tank. Thus, at this first rotary position of the spool 500, the hydraulic actuator 306 operates in a positive force pushing mode.

Figure 6B:
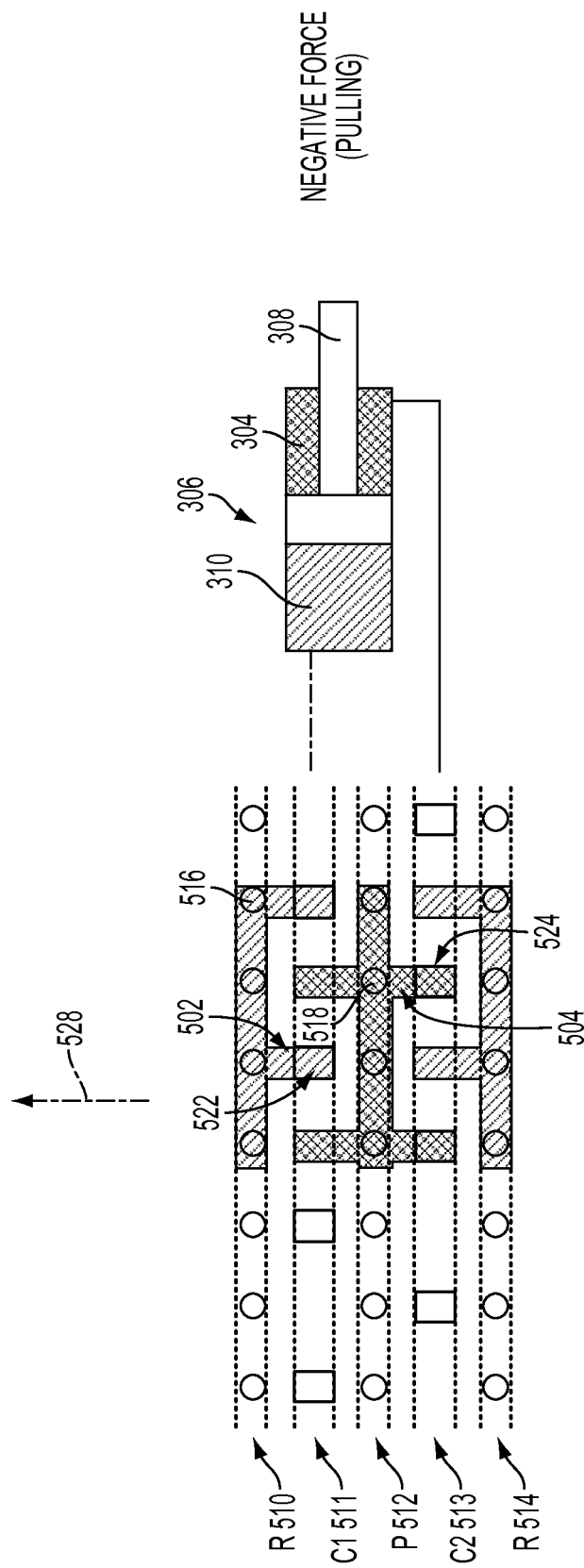
FIG. 6B illustrates a schematic of a hydraulic circuit while a spool of the cartridge-style four-way valve is in a second rotary position within a sleeve of the cartridge-style four-way valve, in accordance with an example embodiment.

FIG. 6B illustrates a schematic of a hydraulic circuit while the spool 500 is in a second rotary position within the sleeve 508, in accordance with an example embodiment. In the second rotary position, the spool grooves 504 (specifically, the end portion 505B and the corresponding end portion on the other side of the spool 500) is, at least partially, aligned with the window 524. Thus, high pressure fluid flows through the groove 512, the holes 518, the window 524, the groove 513, to the chamber 304 of the hydraulic actuator 306. Consequently, the chamber 304 expands, the piston 308 is pulled inwardly (to the left in FIG. 6B), and the chamber 310 contracts.

Also, in the second rotary position, the spool groove 502 is at least partially aligned with the window 522. Thus, fluid pushed out of the chamber 310 flows through the groove 511, the window 522 (and a corresponding window on the other side of the sleeve 508), the groove 502, the holes 516, the groove 510 to the return line and leading to the tank.

Figure 6C:
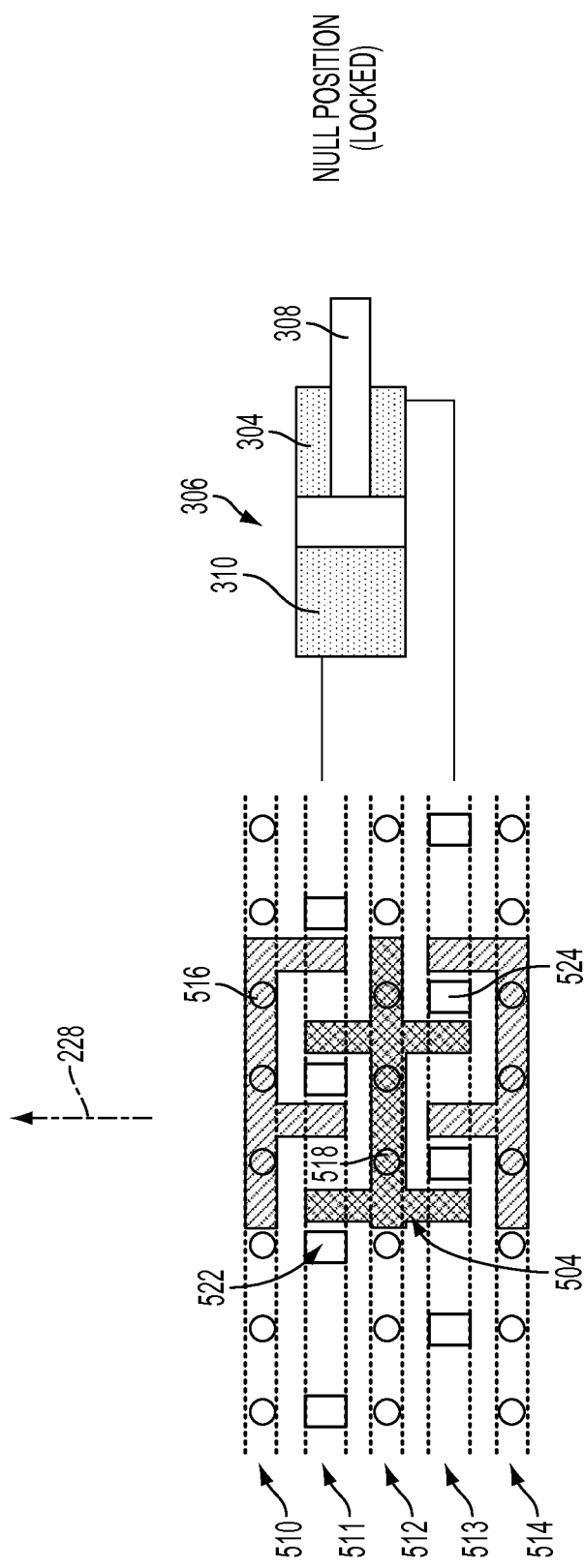
FIG. 6C illustrates a schematic of a hydraulic circuit while a spool of the cartridge-style four-way valve is in a third rotary position within a sleeve of the cartridge-style four-way valve, in accordance with an example embodiment.

FIG. 6C illustrates a schematic of a hydraulic circuit while the spool 500 is in a third rotary position within the sleeve 508, in accordance with an example embodiment. In the third rotary position, none of the grooves of the spool 500 are aligned with the windows 522 and 524 of the sleeve 508. In this case, high pressure fluid is communicated from the supply line through the groove 512 and holes 518 of the sleeve 508 to the groove 504 of the spool 500; however, ends of the groove 504 are not aligned (i.e., do not overlap) the window 522 or the window 524 so that no fluid is communicated to either the chamber 304 or the chamber 310. In this case, the hydraulic actuator 306 is in a null or locked position.

FIGS. 7A-7D illustrate another valve configuration, in accordance with an example embodiment. FIGS. 7A-7D illustrate a manifold-style four-way valve with T-grooves and annular grooves on both a spool 700 and a valve body 702 having a cavity 704 in which the spool 700 rotates.

Figure 7A:
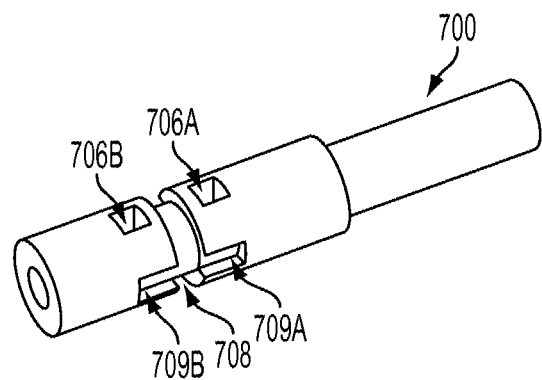
FIGS. 7A-7D illustrate a manifold-style four-way valve with T-grooves and annular grooves on both a spool and a valve body having a cavity in which the spool rotates, in accordance with an example embodiment.
Figure 7B:
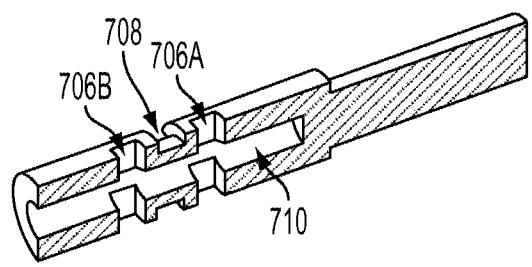

FIG. 7A illustrates the spool 700 and FIG. 7B illustrates a cross section of the spool 700. The spool 700 includes radial port windows such as windows 706A and 706B. The spool 700 also includes a groove 708 having end portions 709A and 709B. In examples, the spool 700 is symmetric and thus the other side of the spool 700 that is not depicted in FIG. 7A has a groove and end portions similar to groove 708 and the end portions 709A and 709B. Reference herein to groove 708 and the end portions 709A and 709B includes reference to the groove and end portions shown in FIG. 7B and the corresponding groove and end portions on the other side of the spool 700 not shown in FIG. 7B. FIG. 7B illustrates that the spool 700 is hollow and includes inner chamber 710.

Figure 7C:
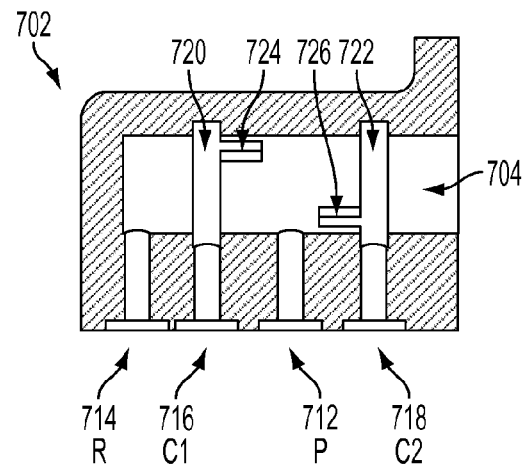

FIG. 7C illustrates the valve body 702. The valve body 702 includes port 712 for receiving high pressure fluid from a supply line, port 714 to communicate fluid through a return line to a tank or reservoir, port 716 to communicate fluid to a from a first chamber (C1) of a hydraulic actuator, and port 718 to communicate fluid to and from a second chamber (C2) of the hydraulic actuator. The valve body 702 also includes annular grooves such as grooves 720 and 722 and associated windows or T-grooves 724 and 726 as shown in FIG. 7C. In examples, the valve body 702 is symmetric, and thus the valve body 702 includes T-grooves on the other side/half of the valve body 702 that is not depicted in FIG. 7C. Reference herein to the T-grooves 724 and 726 includes reference to the T-grooves shown in FIG. 7C and the corresponding T-grooves on the other side of the valve body 702 not shown in FIG. 7C.

Figure 7D:
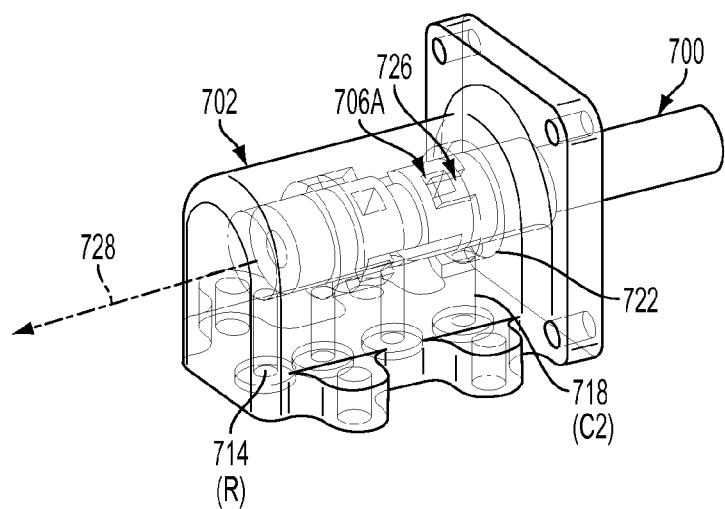

Rotary position of the spool 700 within the valve body 702 determines alignment between the grooves and windows or radial ports of the spool 700 and the T-grooves, annular grooves, ports, and openings of the valve body 702. FIG. 7D illustrates a valve assembly with the spool 700 disposed within the valve body 702 in a given rotary position. The valve body 702 is transparent in FIG. 7D to illustrate details of the spool 700 and inner details of the valve body 702.

In the position shown in FIG. 7D, the end portion 709B of the groove 708 overlaps or is, at least partially aligned with, the T-groove 724. The window 706A of the spool 700 overlaps or is, at least partially aligned with, the T-groove 726 of the valve body 702. Thus, high pressure fluid is received at the port 712, communicated to the groove 708, to the end portion 709B, through the T-groove 724, to the annular groove 720, through the port 716 to the chamber C1 of the hydraulic actuator. The chamber C1 expands, and the chamber C2 thus contracts pushing fluid out of the chamber C2. Fluid forced out of the chamber C2 flows through the port 718, the annular groove 722, through the T-groove 726, the window 706A to the inside chamber 710 of the spool 700, to the port 714, to the return line leading to the tank.

Figure 8A:
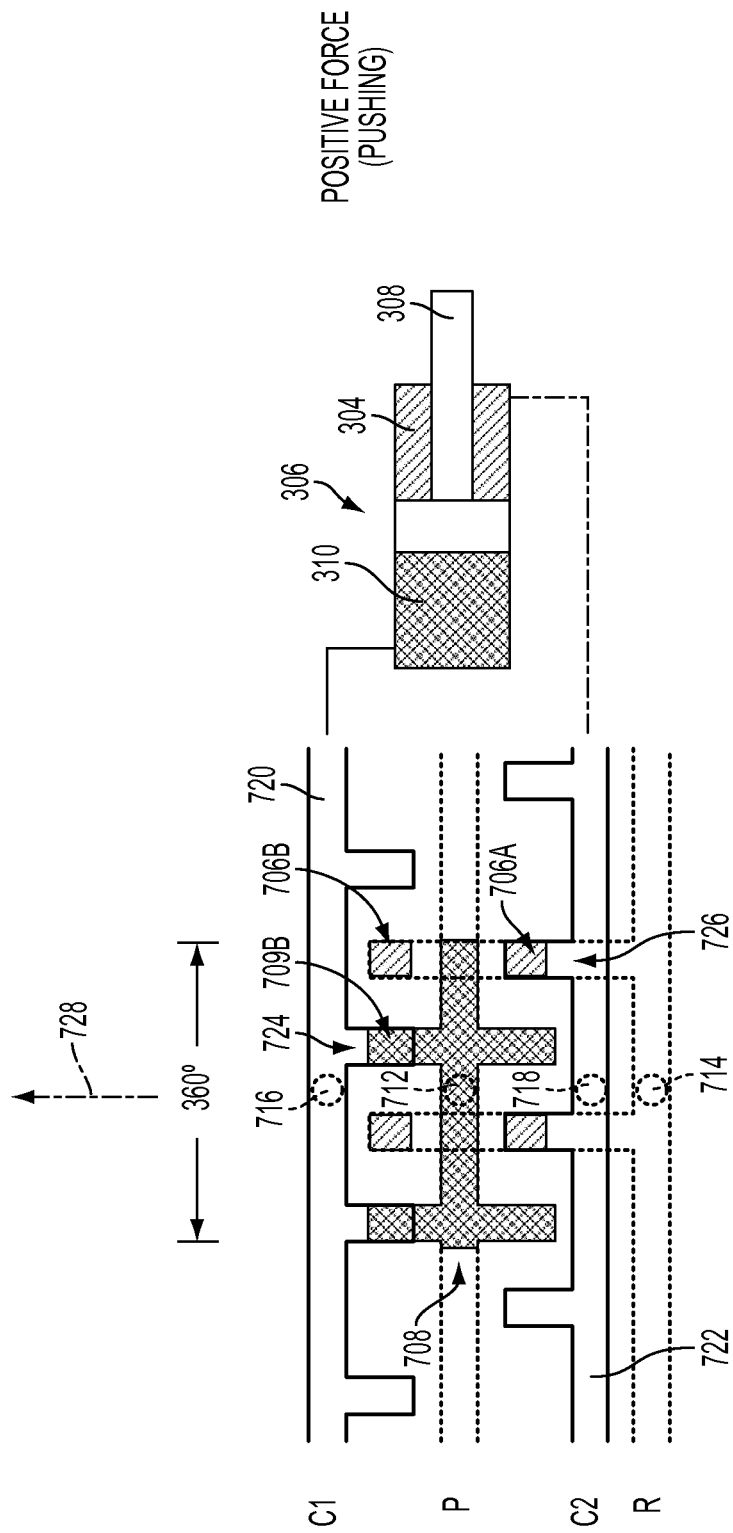
FIG. 8A illustrates a schematic of a hydraulic circuit while the spool of the valve illustrated in FIGS. 7A-7D is in a first rotary position, in accordance with an example embodiment.

FIG. 8A illustrates a schematic of a hydraulic circuit while the spool 700 is in the rotary position depicted in FIG. 7D, in accordance with an example embodiment. FIG. 8A depicts the spool 700 and the valve body 702 as if the spool 700 and the valve body 702 were unwrapped along a longitudinal axis 728 to obtain a planar view. High pressure fluid received at the port 712 is communicated to the groove 708, to the end portion 709B, through the T-groove 724, to the groove 720, through the port 716 to the chamber 310 of the hydraulic actuator 306. The chamber 310 expands, and the chamber 304 contracts forcing fluid out of the chamber 304. Fluid forced out of the chamber 304 flows through the port 718, the groove 722, through the T-slot 726, the window 706A to the inside chamber 710 of the spool 700, to the port 714, to the return line leading to the tank. In this case, the hydraulic actuator 306 is operating in a positive force pushing mode.

Figure 8B:
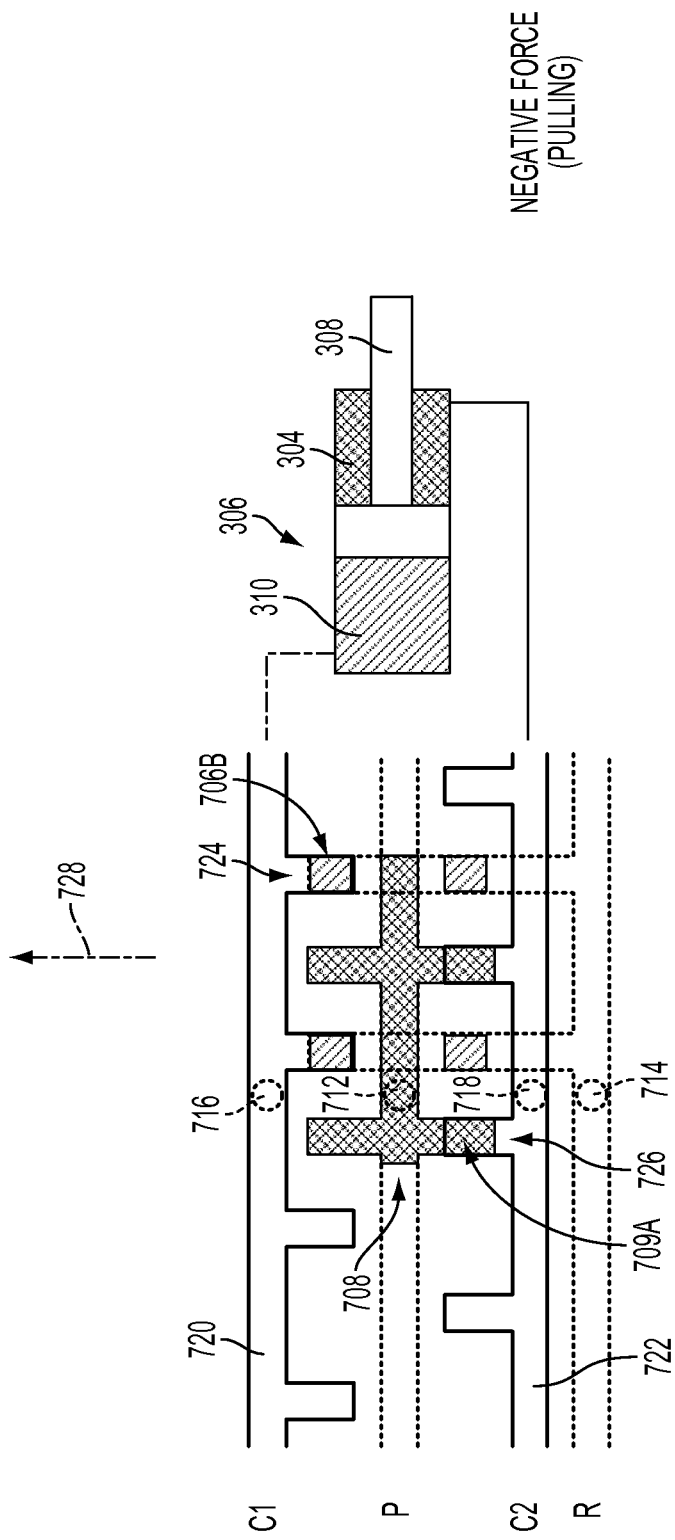
FIG. 8B illustrates a schematic of a hydraulic circuit while the spool of the valve illustrated in FIGS. 7A-7D is in a second rotary position, in accordance with an example embodiment.

FIG. 8B illustrates a schematic of a hydraulic circuit while the spool 700 is in another rotary position, in accordance with an example embodiment. High pressure fluid received at the port 712 is communicated to the groove 708, to the end portion 709A, through the T-groove 726, to the groove 722, through the port 718 to the chamber 304 of the hydraulic actuator 306. The chamber 304 expands, and the chamber 310 contracts forcing fluid out of the chamber 310. Fluid forced out of the chamber 310 flows through the port 716, the groove 720, through the T-groove 724, the window 706B to the inside chamber 710 (not shown in FIG. 8B) of the spool 700, to the port 714, to the return line leading to the tank. In this case, the hydraulic actuator 306 is operating in a negative force pulling mode. The illustrations in FIGS. 8A-8B are examples of operation, and are not limiting. Other rotary positions of the spool 700 are possible to operate the hydraulic actuator in other modes such as brake/coast mode.

FIGS. 9A-9C illustrates still another valve configuration, in accordance with an example embodiment. FIGS. 9A-9C illustrate a manifold-style four-way valve with annular and T-grooves on both spool 900 and valve body 902 having a cavity 904 within which the spool 900 is configured to rotate.

FIG. 9A illustrates the spool 900 and FIG. 9B illustrates a cross section of the spool 900. The spool 900 includes radial port windows such as windows 906A and 906B. Multiple windows such as the windows 906A and 906B are disposed around a circumference of the spool 900. Reference herein to the window 906A includes reference to the window 906A shown in FIG. 9A in addition to other windows corresponding to the window 906A on the other side of the spool 900 that is not shown in FIG. 9A. Similarly, reference herein to the window 906B includes reference to the window 906B shown in FIG. 9A in addition to other windows corresponding to the window 906B on the other side of the spool 900 that is not shown in FIG. 9A. As shown in FIG. 9A, the window 906A is different in size from the window 906B. In this case, there are a larger number of the windows 906B around the circumference of the spool 900 than the windows 906A.

The spool 900 also includes a groove 908 having end portions 909A and 909B. In examples, the spool 900 is symmetric and thus the other side of the spool 900 that is not depicted in FIG. 9A has a groove and end portions similar to the groove 908 and the end portions 909A and 909B. Reference to the end portions 909A and 909B includes reference to the end portions shown in FIG. 9A and the corresponding end portions on the other side of the spool 900 not shown in FIG. 9A. FIG. 9B illustrates that the spool 900 is hollow and includes inner chamber 910.

FIG. 9C illustrates a cross section of the valve body 902. The valve body 902 includes port 912 for receiving high pressure fluid from a supply line, port 914 to communicate fluid through a return line to a tank or reservoir, port 916 to communicate fluid to or from a first chamber (C1) of a hydraulic actuator, and port 918 to communicate fluid to and from a second chamber (C2) of the hydraulic actuator. The valve body 902 also includes annular grooves such as grooves 920 and 922 and associated T-grooves 924 and 926 as shown in FIG. 9C. In examples, the valve body 902 is symmetric, and thus the valve body 902 includes grooves on the other side/half of the valve body 902 that is not depicted in FIG. 9C. Reference herein to the T-grooves 924 and 926 includes reference to the windows shown in FIG. 9C and the corresponding windows on the other side of the valve body 902 not shown in FIG. 9C.

FIGS. 10A-10D illustrate a valve assembly with the spool 900 disposed within the valve body 902 at four respective rotary positions, in accordance with an example embodiment. FIGS. 11A-11D illustrate hydraulic schematics corresponding to FIGS. 10A-10D, in accordance with an example embodiment. FIGS. 11A-11D depicts the valve of FIGS. 9A-9C as if, while the spool 900 is inside the valve body 902, the spool 900 and the valve body 902 were unwrapped along a longitudinal axis 928 into a planar view. FIGS. 10A-10D are described concurrently with FIGS. 11A-11D.

Figure 11A:
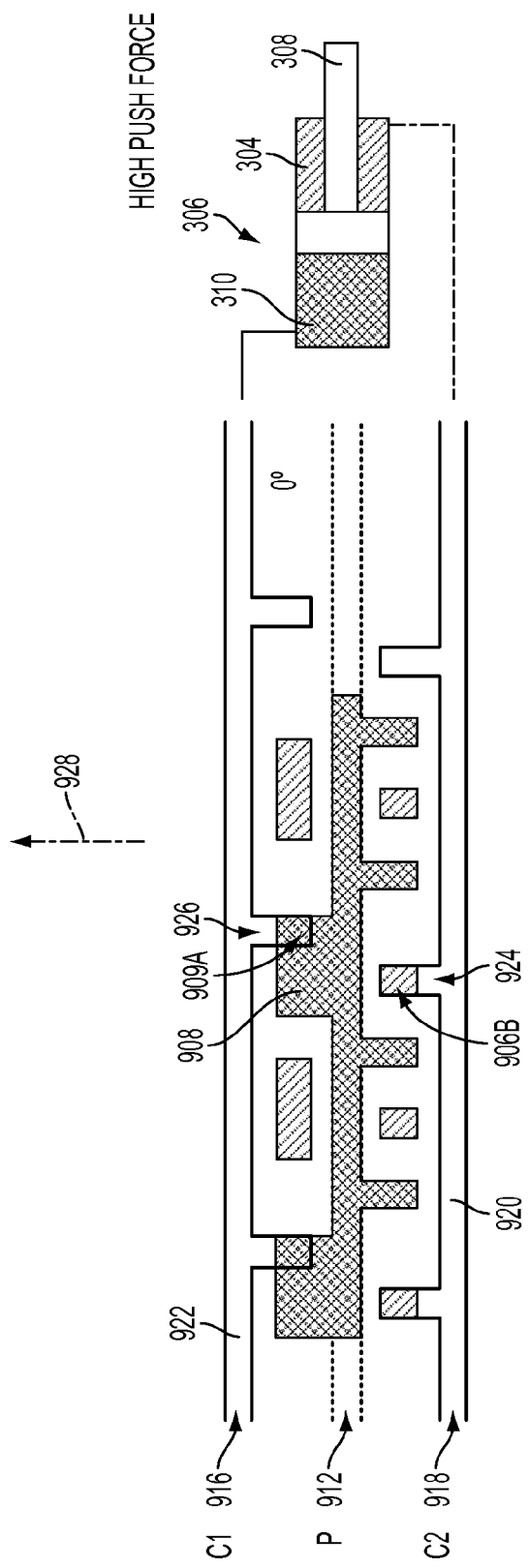
FIGS. 11A-11D illustrate hydraulic schematics corresponding to FIGS. 10A-10D, in accordance with an example embodiment.

FIGS. 10A and 11A correspond to the spool 900 being at a 0° rotary position. In this rotary position, the hydraulic actuator 306 operates in a high push force mode. The end portion 909A of the groove 908 overlaps or is, at least partially aligned with, the T-groove 926. The window 906B of the spool 900 overlaps or is, at least partially aligned with, the T-groove 924 of the valve body 902. Thus, high pressure fluid is received at the port 912, communicated to the groove 908, to the end portion 909A, through the T-groove 926, to the annular groove 922, through the port 916 to the chamber 310 (C1) of the hydraulic actuator 306. The chamber 310 expands, and the chamber 304 (C2) contracts forcing fluid out of the chamber 304. Fluid forced out of the chamber 304 flows through the port 918, the groove 920, through the T-groove 924, the window 906B to the inside chamber 910 of the spool 900, to the port 914, to the return line leading to the tank.

Figure 11B:
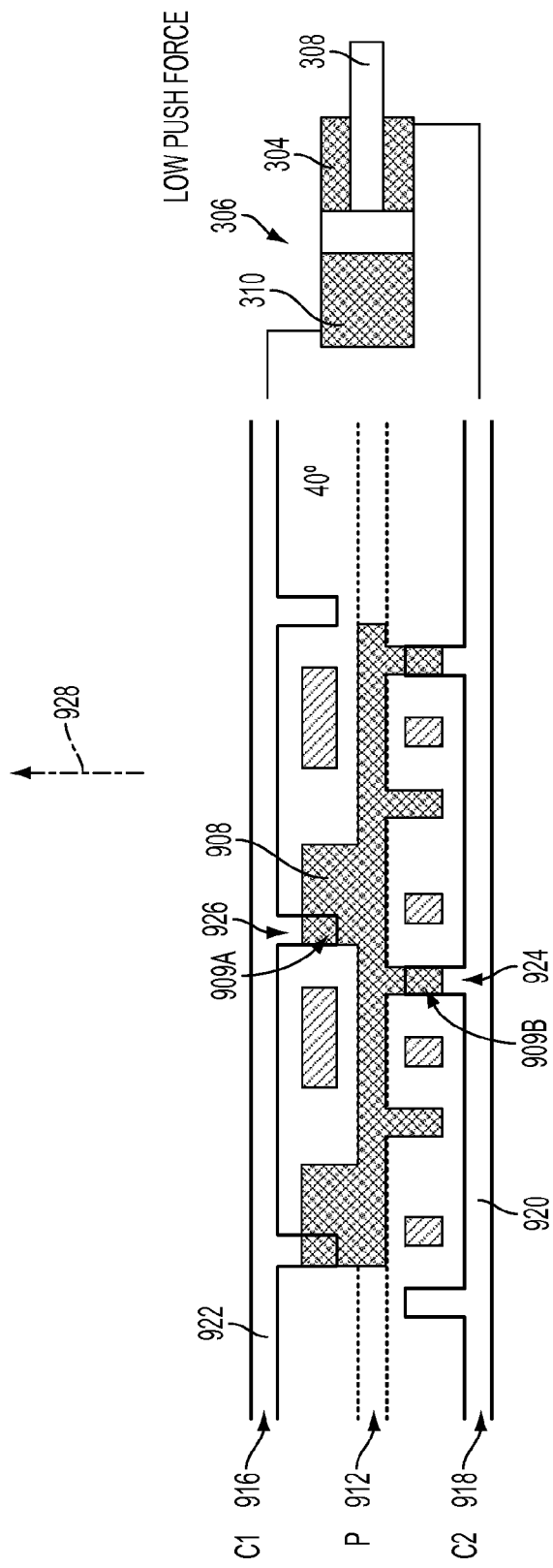

FIGS. 10B and 11B correspond to the spool 900 being at a 40° rotary position. In this rotary position, the hydraulic actuator 306 operates in a low push force mode where both chambers 304 and 310 of the hydraulic actuator are connected to the high pressure supply line. Both end portions 909A and 909B of the groove 908 overlap or are, at least partially aligned with, the T-grooves 926 and 924, respectively. Thus, high pressure fluid is received at the port 912, communicated to the groove 908, to the end portions 909A, through the T-groove 926, to the annular groove 922, through the port 916 to the chamber 310 (C1) of the hydraulic actuator 306. The chamber 310 expands, and the chamber 304 (C2) contracts forcing fluid out of the chamber 304. Fluid forced out of the chamber 304 flows through the port 918, the annular groove 920, through the T-groove 924, the end portion 909B through the groove 908, the end portion 909A, the T-groove 926, the annular groove 922, through the port 918, to the chamber 310, supplementing flow from the supply line going to the chamber 310. Thus, both chambers 304 and 310 are connected through the supply line.

This mode of operation may be referred to as a low push force mode because the force applied to the piston 308 in this case approximately equals the supply pressure multiplied by the area difference between the piston area in the chamber 310 and the piston area in the chamber 304. The difference in area is equal to a cross section area of a rod of the piston 308. On the other hand, in the high force mode described in FIGS. 10A and 11A, the force applied to the piston equals the supply pressure multiplied by the area of the piston in chamber 310 minus the return pressure multiplied by the piston area in the chamber 304. This force is higher than the force applied in the low push force mode described in FIGS. 10B and 11B. The low push force mode can also be used when the piston 308 is retracting under an external load. In this case, flow from the contracting chamber 310 exceeds flow filling the chamber 304, and the net flow is pushed back to the high pressure supply line, thus regenerating hydraulic power.

Figure 11C:
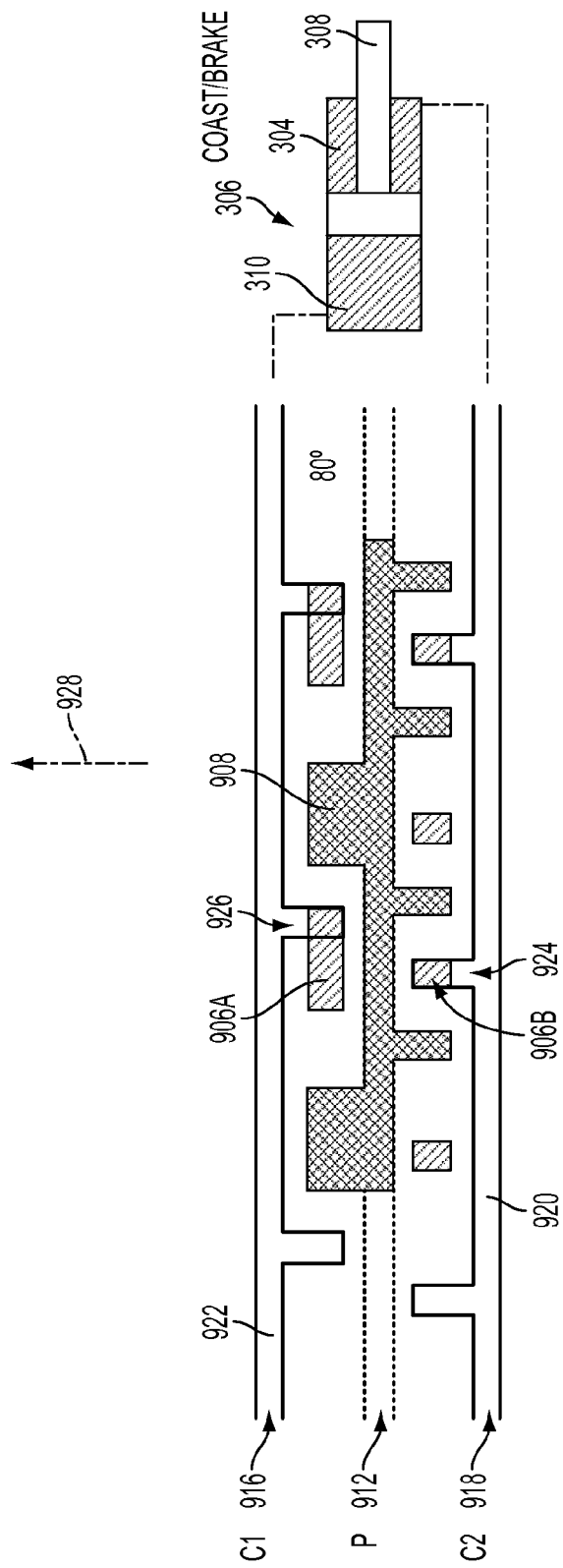

FIGS. 10C and 11C correspond to the spool 900 being at an 80° rotary position. In this rotary position, the hydraulic actuator 306 operates in a coast/brake mode where both chambers 304 and 310 of the hydraulic actuator are connected to the return line. The brake mode is generally used when the external force applied on the actuator 306 is in the same direction as the direction of movement of the piston 308. For instance, the piston 308 may be extending (moving to the right in FIG. 11C) and is being assisted with gravity. In this case, high pressure fluid may not be needed to move the piston 308. No portion of the groove 908 of the spool 900 communicates with the T-grooves 924 and 926. Thus, high pressure fluid is blocked at the groove 908. Even though fluid is not supplied from the high pressure supply line, fluid is supplied from the tank through the return line. The chamber 310 expands, and the chamber 304 contracts forcing fluid out of the chamber 304. Fluid forced out of the chamber 304 flows through the port 918, the annular groove 920, through the T-groove 924, the window 906B, to the inside chamber 910 of the spool 900, to the port 914, to the return line leading to the tank. Also, low pressure fluid is drawn through the window 906A, the T-groove 926, the annular groove 922, the port 916 to the chamber 310.

Figure 11D:
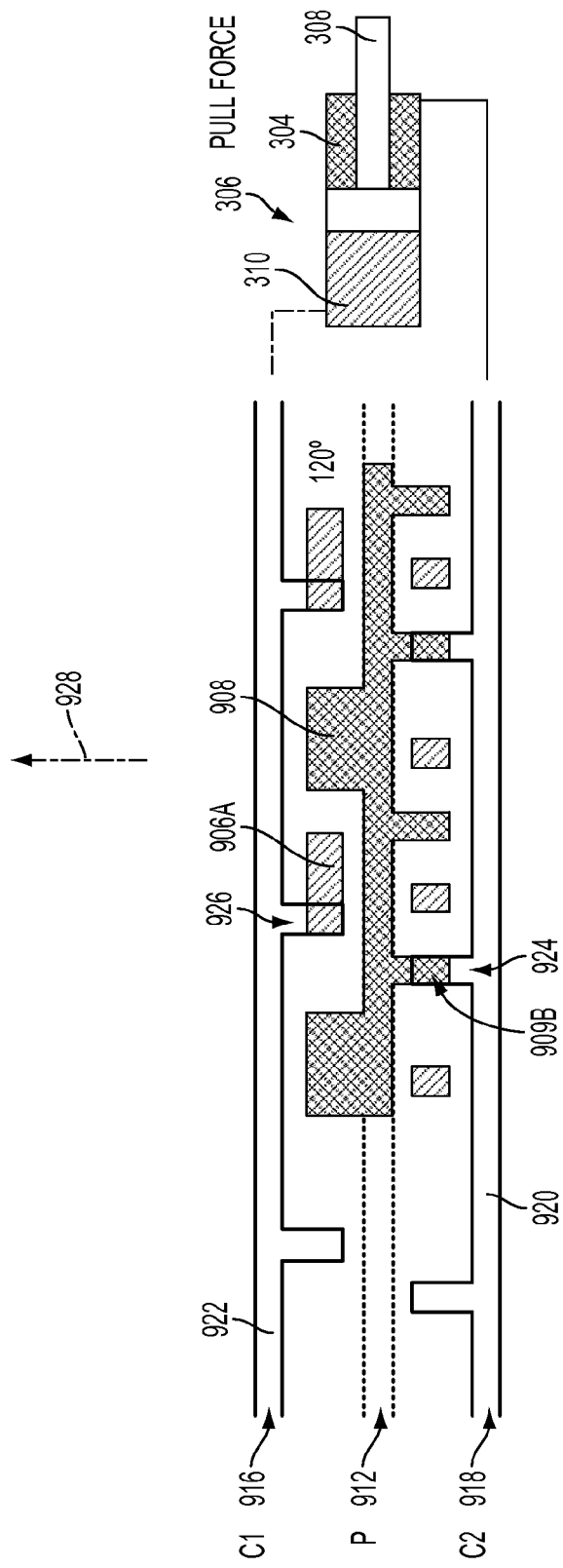

FIGS. 10D and 11D correspond to the spool 900 being at a 120° rotary position. In this rotary position, the hydraulic actuator 306 operates in a pull force mode. The end portion 909B of the groove 908 overlaps or is, at least partially aligned with, the T-groove 924. The window 906A of the spool 900 overlaps or is, at least partially aligned with, the T-groove 926 of the valve body 902. Thus, high pressure fluid is received at the port 912, communicated to the groove 908, to the end portion 909B, through the T-groove 924, to the annular groove 920, through the port 918 to the chamber 304 of the hydraulic actuator 306. The chamber 304 expands, and the chamber 310 contracts forcing fluid out of the chamber 310. Fluid forced out of the chamber 310 flows through the port 916, the annular groove 922, through the T-groove 926, the window 906A to the inside chamber 910 of the spool 900, to the port 914, to the return line leading to the tank.

The rotary positions shown in FIGS. 10A-10D and correspondingly in FIGS. 11A-11D are examples for illustration only. Other positions are possible as well because the spool 900 is configured for continuous wrap-around rotation within the valve body 902.

Figure 12:
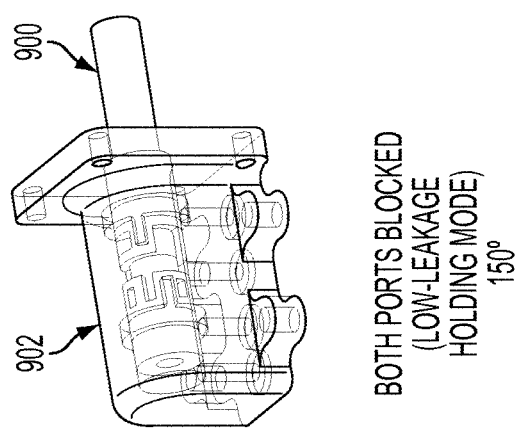
FIG. 12 illustrates the valve described in FIGS. 10A-10D while the spool is at a 150° rotary position within the valve body, in accordance with an example embodiment.

For example, FIG. 12 illustrates the valve described in FIGS. 9A-9C while the spool 900 is at a 150° rotary position within the valve body 902, in accordance with an example embodiment. The groove 908 receives the high pressure fluid, but the end portions 909A and 909B are not aligned with (i.e., do not overlap) the T-grooves 926 and 924, and thus, high pressure fluid is not communicated to either chamber of the hydraulic actuator 306. Similarly, the windows 906A and 906B are not aligned with (i.e., do not overlap) T-grooves 926 and 924, and thus, the chambers 304 and 306 are blocked from low pressure fluid in the tank. In this case, the hydraulic actuator 306 is in a holding or locked mode. Other example rotary positions are also possible.

FIGS. 13A-13D illustrates yet still another valve configuration, in accordance with an example embodiment. FIGS. 13A-13D illustrate a four-way valve with annular and T-grooves on a spool 1300 and axial grooves in a valve body 1302 within which the spool 1300 is configured to rotate.

FIG. 13A illustrates the spool 1300. The spool 1300 is hollow and includes port windows such as port windows 1304A and 1304B associated with low pressure fluid. The spool 1300 also includes a groove 1306 associated with high pressure fluid. Instead of the valve body 1302 including annular grooves similar to the configuration illustrated in FIGS. 9A-9C (e.g., the annular grooves 920 and 922), the spool 1300 includes circumferential grooves 1308A and 1308B.

FIG. 13B illustrates the valve body 1302. The valve body 1302 includes port 1310 for receiving high pressure fluid from a supply line, port 1312 to communicate fluid through a return line to a tank or reservoir, port 1314 to communicate fluid to a from a first chamber (C1) of a hydraulic actuator, and port 1316 to communicate fluid to and from a second chamber (C2) of the hydraulic actuator. The valve body 1302 also includes axial grooves such as axial grooves 1318A and 1318B.

FIG. 13C illustrates a cross section of the valve while the spool 1300 is within the valve body 1302. FIG. 13C illustrates that the spool 1302 is hollow and includes an inner chamber 1320.

In some examples, such construction may make the valve body 1302 stronger and/or lighter when compared to other constructions. For instance, the construction in FIGS. 13A-13D avoids machining annular grooves in the valve body 1302, and thus decreases manufacturing complexity of the valve body 1302. The spool 1300 has a circumferential groove (e.g., the groove 1306), so adding other circumferential grooves such as the circumferential grooves 1308A and 1308B may not affect machining complexity of the spool 1300.

In another example, the circumferential grooves 1306, 1308A, and 1308B may all be made as annular grooves into the valve body 1302 instead of the spool 1300. In still another example, the grooves 1306, 1308A, and 1308B could be made partially (e.g. half-deep) on both the spool 1300 and the valve body 1302.

FIG. 13D illustrates a valve assembly with the spool 1302 at a given rotary position within the valve body 1302. The valve body 1302 is transparent in FIG. 13D to show the details of the spool 1300 and the inner details of the valve body 1302. As shown in FIG. 13D, the axial groove 1318A overlaps the groove 1306, and thus high pressure fluid is communicated to the groove 1308A, through the port 1314 to the chamber C1 of the hydraulic actuator (not shown), and in response, the chamber C1 expands, while the chamber C2 contracts as a piston of the hydraulic actuator moves. Also, the axial groove 1318B overlaps the window 1304B. Thus, fluid forced out of the chamber C2 flows through the port 1316, the groove 1308B, the axial groove 1318B, the window 1304B to the inside chamber 1320 of the spool 1300, through the port 1312, to the return line leading to the tank. The rotary position of the spool 1300 illustrates in FIG. 13D is an example for illustration, and other rotary positions are contemplated to operate the hydraulic actuator in other modes.

The configurations shown in FIGS. 2A-13D are example configurations. Other configurations that combine features from the configurations described with respect to FIGS. 2A-13D are contemplated herein. In all the configurations described herein, the spool is configured to rotate in a clockwise direction or a counter-clockwise within the valve body (or sleeve) to reach a given rotary position. Also, the spool described in any of the configurations of FIGS. 1-13D may be configured to rotate by a rotary actuator such as a brushless DC motor or any other type of rotary actuators. A rotary position sensor may be coupled to the spool to indicate the rotary position of the spool to a controller of the valve such that the controller controls the rotary position of the spool accurately (e.g., by implementing closed-loop feedback control for the rotary position of the spool).

Further, the valves illustrated in FIGS. 2A-13D are four-way valves. However, two-way and three-way valves can be constructed using similar rotary configuration as those described herein. Such two-way and three-way valves are thus contemplated herein. Also, the configuration described herein involves a direct drive valve, where the valves described in FIGS. 2A-13D directly control flow to and from a hydraulic actuator to control motion of the hydraulic actuator. However, multi-stage valves are also contemplated, where any of the valves described herein can function as a hydraulic first stage to drive a spool of a larger valve that control flow to a hydraulic actuator.

Although the hydraulic actuators described herein to be controlled by the valves of FIGS. 2A-13D involve a hydraulic cylinder, a hydraulic motor (e.g., a mechanical actuator that converts hydraulic pressure and flow into torque and angular displacement/rotation) is also contemplated.

IV. EXAMPLE METHODS

Figure 14:
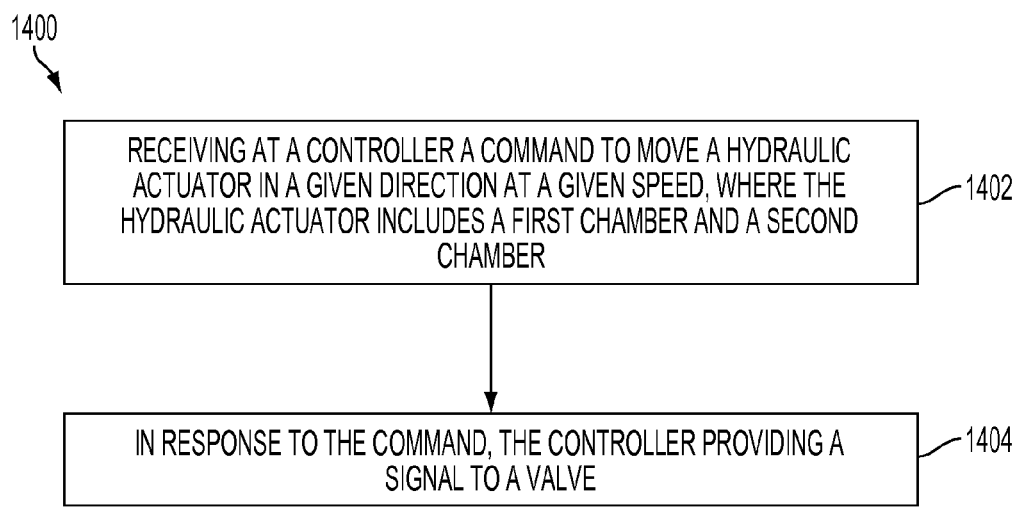
FIG. 14 is a flow chart of a method for controlling a valve, in accordance with an example embodiment.

FIG. 14 is a flow chart of a method 1400 for controlling a valve, in accordance with an example embodiment. The method 1400 may include one or more operations, functions, or actions as illustrated by one or more of blocks 1402-1404. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 1400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer-readable medium, for example, such as computer-readable media that stores data for short periods of time like register memory, processor cache and Random Access Memory (RAM). The computer-readable medium may also include non-transitory media or memory, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, a tangible storage device, or other article of manufacture, for example. The computer-readable medium, the processor, the program code may all be included within a controller of a valve. In addition, for the method 1400 and other processes and methods disclosed herein, each block in FIG. 14 may represent circuitry that is wired to perform the specific logical functions in the process.

At block 1402, the method 1400 includes receiving at a controller a command to move a hydraulic actuator in a given direction at a given speed, where the hydraulic actuator includes a first chamber and a second chamber. The controller may be a computing device comprising one or more processors configured to execute program instructions stored in the computing device (e.g., a memory within the computing device), for example. The controller may be in communication with input devices such as a joystick or any other type of input devices. In an example, a user of a hydraulic machine may provide a command through the input device to the controller so as to cause the controller to provide control signals to a hydraulic system (e.g., pump, valves, actuators, tank, etc.) and move a hydraulic actuator (such as the hydraulic actuator 306 having the chambers 304 and 310) based on the command. For instance, the command may involve instructions to move the actuator in a given direction at a given speed. In another example, the command may be generated by an autonomous robotic device that includes a hydraulic system configured to control motion of the robotic device. The robotic device may be configured to autonomously generate movement commands to execute a particular task. The movement commands may be provided to, and received at, the controller of the hydraulic system.

At block 1404, the method 1400 includes, in response to the command, the controller providing a signal to a valve. The controller may be integrated into the valve or may be remote from, but in communication with, the valve. The valve can include any of the valve configurations illustrated in FIGS. 2A-13D. The valve may include a valve body or sleeve having a plurality of openings configured along a length of the sleeve. The plurality of openings may include, for example, a first opening configured to receive pressurized fluid from a supply line, a second opening configured to communicate fluid to a return line connected to a reservoir for including fluid having pressure lower than that of the pressurized fluid, a third opening configured to communicate fluid to and from the first chamber of the hydraulic actuator, and a fourth opening configured to communicate fluid to and from the second chamber of the hydraulic actuator. The valve may also include a spool rotatable within the sleeve. The spool may include a respective plurality of openings along a length of the spool corresponding to the plurality of openings of the sleeve. The valve may further include a rotary actuator (e.g., a motor) coupled to the spool and configured to rotate the spool within the sleeve.

Within some examples, the term "opening" herein is used to refer to holes (whether through-holes or blocked holes), grooves (e.g., T-grooves, annular grooves, circumferential grooves etc.), radial ports, windows, etc.

The signal is provided by the controller to the rotary actuator to rotate the spool to a given rotary position in a clockwise or a counter-clockwise direction to cause at least a partial alignment between a subset of the respective plurality of openings of the spool and a subset of the plurality of openings of the sleeve. As described above, such alignment (or overlap between the openings) may: (i) connect one of the first chamber and the second chamber of the hydraulic actuator to the supply line, and connect the other chamber to the return line, or (ii) connect both the first chamber and the second chamber of the hydraulic actuator to either the supply line (low push force mode) or the return line (coast/brake mode).

Figure 15:
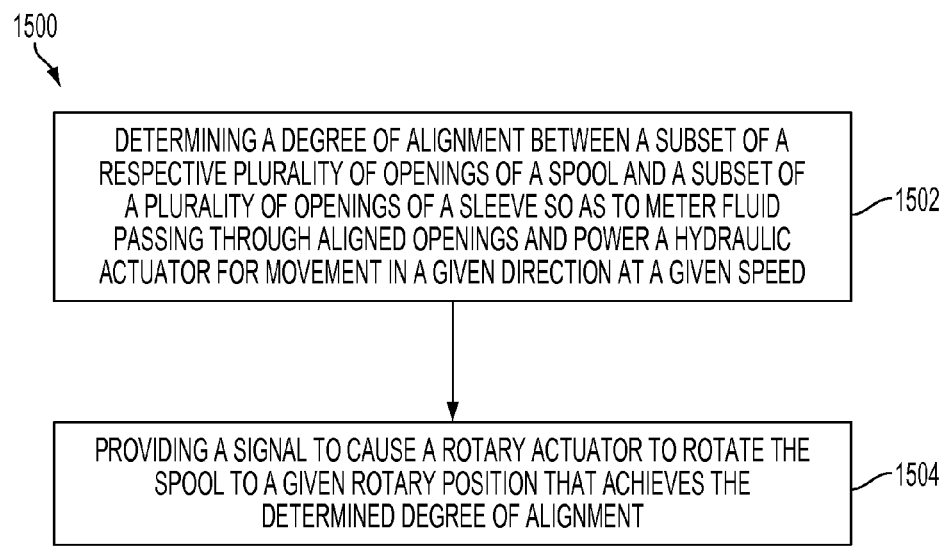
FIG. 15 is a flow chart of a method for metering hydraulic fluid across a valve, in accordance with an example embodiment.

FIG. 15 is a flow chart of a method 1500 for metering hydraulic fluid across a valve, in accordance with an example embodiment. The method 1500 may include one or more operations, functions, or actions as illustrated by one or more of blocks 1502-1504. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. The method 1500 can be implemented with the method 1400 using the controller of the valve described above.

At block 1502, the method 1500 includes determining a degree of alignment between a subset of a respective plurality of openings of a spool and a subset of a plurality of openings of a sleeve so as to meter fluid passing through aligned openings and power a hydraulic actuator for movement in a given direction at a given speed. The rotary position of the spool also defines a degree of alignment between the subset of openings of the spool and the subset of openings of the sleeve. The degree of alignment or overlap between the respective openings causes fluid to be metered or throttled through aligned openings to power the hydraulic actuator for movement in the given direction at the given speed. Metering the fluid across the valve determines the flow rate of the fluid and determines pressure in both chambers of the actuator, and thus controls the speed and direction of motion of the actuator. Thus, the controller may, in response to the command to move the actuator at a given speed in a given direction, determine the degree of alignment that would meter or throttle the hydraulic fluid across the valve and cause the actuator in the given direction at the given speed.

In examples, the controller may also be configured to determine which mode the hydraulic actuator should operate in. For instance, when the piston is extending, the valve could operate in push mode, but if negative work is being done (i.e., load is assisting the piston to extend not opposing the piston), the valve could operate in braking mode, which is much more efficient. As another example, if the piston is exerting low push force, then the valve could operate in a low push force mode. The controller may be configured to base the choice of mode on some combination of the following: chamber pressures, desired force and speed for the piston, actual force and speed, predicted force and speed, supply and return pressure, actuator piston areas, resistance of hoses, fittings etc., resistance of valve openings in various modes with openings fully aligned, tolerance for tracking error, required force-control bandwidth, required smoothness and valve switching time. The controller may use hysteresis so as to avoid rapid switching back and forth between two modes.

At block 1504, the method 1500 includes providing a signal to cause a rotary actuator to rotate the spool to a given rotary position that achieves the determined degree of alignment. Based on the determined degree of alignment, the controller may determine the corresponding rotary position of the spool, and provide electric signals to the rotary actuator to rotate the spool to the determined rotary position.

In some examples, in addition to controlling the rotary position of the spool to determine the degree of alignment, the controller may also be configured to control a pump of a pressure source so as to provide a certain amount of flow at a particular pressure. In this manner, the controller may achieve a particular pressure differential or a pressure drop between the pressure source and a chamber of the two chambers of the actuator based on the signal provide to the rotary actuator and the resulting rotary position of the spool.

In examples, a rotary position sensor may be coupled to the spool, and may provide information indicative of the rotary position of the spool within the sleeve or valve body to the controller. The controller may be configured to use the information to accurately control the position of the spool within the sleeve, e.g., via closed loop feedback control. For instance, the controller may modify the signal provided to the rotary actuator based on the position information received from the rotary position sensor indicating a discrepancy or error between a commanded rotary position and an actual rotary position of the spool.

Figure 16:
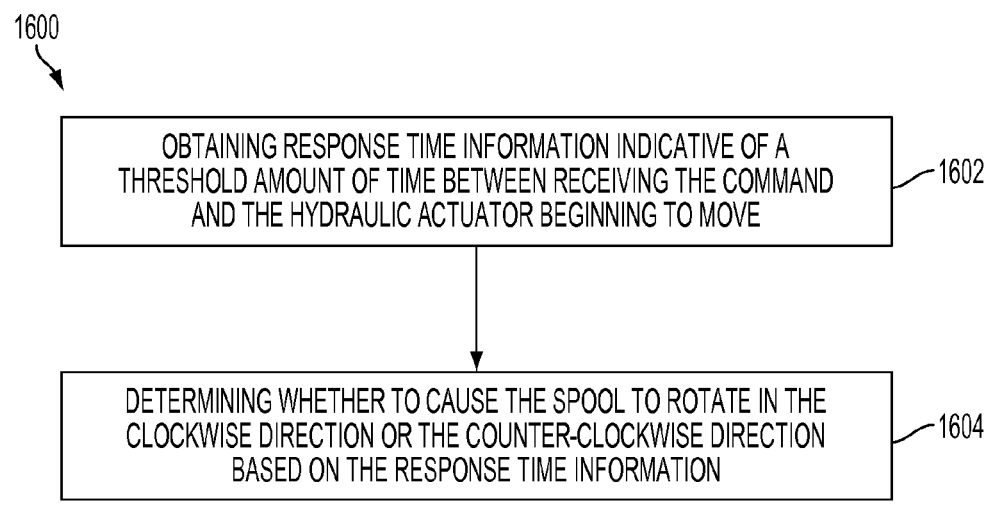
FIG. 16 is a flow chart of method for determining a direction of rotation of a spool, in accordance with an example embodiment.

FIG. 16 is a flow chart of a method 1600 for determining a direction of rotation of a spool, in accordance with an example embodiment. The method 1600 may include one or more operations, functions, or actions as illustrated by one or more of blocks 1602-1604. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. The method 1600 can be implemented with the method 1400 using the controller of the valve described above.

At block 1602, the method 1600 includes obtaining response time information indicative of a threshold amount of time between receiving the command and the hydraulic actuator beginning to move. The spool can rotate either clockwise or counter-clockwise to reach a given rotary position. As an example for illustration, a rotary position of the spool that corresponds to a given command may be about 80° away from an initial position of the spool in a clockwise direction. The controller may thus cause the spool to rotate the spool 80° in the clockwise direction or cause the spool to rotate 280° in the counter-clockwise direction to reach the rotary position. Rotation of the spool to reach the given rotary position takes a first amount of time if the spool rotates in the clockwise direction, and takes a second amount of time different from the first amount of time if the spool rotates in the counter-clockwise direction. In this example, the first amount of time is shorter than the second amount of time. Thus, the controller may be configured to select whether to cause the spool to rotate in a clockwise direction or a counter-clockwise direction based on a desired response time for the valve. Response time indicates a maximum or threshold amount of time (e.g., 100 milliseconds) that should lapse between receiving the command and beginning of motion of the hydraulic actuator, for example. In the example mentioned above, if a faster response is commanded, the controller may cause the spool to rotate 80° in the clockwise direction. If a slower response is commanded, the controller may cause the spool to rotate 280° in the counter-clockwise direction.

An appropriate or desired response time may be based on characteristics of the hydraulic actuator. In some examples, a shorter response time may have the advantage of causing the actuator to respond faster, but may excite frequencies that may cause deterioration of the hydraulic system (e.g., vibration, resonance, wear, high loads/stresses, etc.). Whether harmful frequencies are excited may depend on characteristics of the hydraulic actuator and the valve. The characteristics may include a size of the hydraulic actuator, volume of the first chamber and the second chamber, cross sectional area of a piston, speed of motion of the piston, a mass being pushed or pulled, by the piston, oil volume between the valve and the piston, etc. In other examples, a faster response time may be more appropriate. Thus, the controller may determine an appropriate or desired response time based on characteristics of components of the hydraulic system. In another example, the response time may be predetermined and the controller may have access to the predetermined response time. The predetermined response time may, for example, be stored in a memory coupled to the controller, and the controller may be configured to obtain the response time from the memory.

At block 1604, the method 1600 includes determining whether to cause the spool to rotate in the clockwise direction or the counter-clockwise direction based on the response time information. The controller may be configured to determine whether to select clockwise rotation or counter-clockwise rotation to achieve the appropriate or desired response time. In the example, where the response time is based on the characteristics of the hydraulic actuator, the controller determines whether to select clockwise rotation or counter-clockwise rotation based on the characteristics of the hydraulic actuator.

In examples, the controller may be configured to choose whether to cause the spool to rotate clockwise or counter-clockwise based on an appropriate sequence of travel of the spool. For example, the controller may determine that the spool should be rotated to a particular rotary position associated with a particular mode of operation based on a given command. The spool can rotate either clockwise or counter-clockwise to reach the particular rotary position associated with the particular mode of operation. However, in one direction (e.g., the clockwise direction), the spool would pass through a rotary position associated with a coast/brake mode to reach the given rotary position. In the opposite direction (e.g., the counter-clockwise direction), the spool may pass through rotary positions associated with other modes to reach the particular rotary position. The controller may determine that passing through the rotary position associated with the coast mode to reach the particular position avoids any undesired transient behavior, while rotating the spool in the other direction passing through rotary positions associated with other modes may cause undesired transient behavior. In this case, the controller may cause the spool to rotate in the direction where the spool passes through the coast mode.

In another example, the controller may determine that the spool should switch from a rotary position associated with a pushing force mode to a pulling force mode. The controller may cause the spool to rotate in a direction that avoids passing through a rotary position associated with braking mode.

Thus, instead of, or in addition to, determining the direction of rotation based on response time, the controller may determine the direction of rotation based on what modes the spool may pass through if it rotates in a particular direction.

In this manner, the controller may be configured to perform several operations to control the valve and control motion of a piston of the hydraulic actuator. The controller may receive a command indicative of a desired position for the piston, a desired force to be exerted by the piston, a desired velocity for the piston, and possibly a tolerance for tracking error to one or more of the desired position, the desired force, and the desired velocity. The controller may also determine one or more parameters such as supply pressure, return pressure, current piston position, current force exerted by the piston, and current velocity of the piston. The controller further determines which mode of operation that valve should operate in to achieve adequate tracking of the desired position, the desired force, and the desired velocity of the piston while consuming minimum hydraulic power. For instance, the controller may determine whether to connect one of the first chamber and the second chamber of the hydraulic actuator to the supply line, and connect the other chamber to the return line, or (ii) connect both the first chamber and the second chamber of the hydraulic actuator to either the supply line or the return line. Based on (i) the determined mode of operation, (ii) the desired position the desired force, and/or the desire velocity, and (iii) the one or more parameters, the controller determines a rotary position of the spool. The controller provides a signal to the valve so as to cause the spool to move to the determined rotary position. As described above, the controller determines whether to rotate the spool in a clockwise or counter-clockwise direction based on factors such as response time or modes the spool may pass through if it rotates in a particular direction. The controller may adjust the signal based on feedback indicative of the rotary position of the spool.

V. CONCLUSION

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A hydraulic circuit comprising:
a supply line for containing pressurized fluid;
a return line including fluid having pressure lower than that of the pressurized fluid;
a hydraulic actuator including a first chamber and a second chamber; and
a valve comprising:
a sleeve having a plurality of openings configured along a length of the sleeve, wherein the plurality of openings includes at least: a first opening configured to receive the pressurized fluid from the supply line, a second opening configured to communicate fluid to the return line, a third opening configured to communicate fluid to and from the first chamber of the hydraulic actuator, and a fourth opening configured to communicate fluid to and from the second chamber of the hydraulic actuator;
a spool rotatable within the sleeve, the spool including a respective plurality of openings along a length of the spool corresponding to the plurality of openings of the sleeve; and
a rotary actuator coupled to the spool for rotating the spool within the sleeve to a given rotary position in a clockwise or a counter-clockwise direction to cause at least a partial alignment between a subset of the respective plurality of openings of the spool and a subset of the plurality of openings of the sleeve so as to: (i) connect one of the first chamber and the second chamber of the hydraulic actuator to the supply line, and connect the other chamber to the return line, or (ii) connect both the first chamber and the second chamber of the hydraulic actuator to the return line, wherein rotation of the spool to reach the given rotary position takes a first amount of time if the spool rotates in the clockwise direction and takes a second amount of time different from the first amount of time if the spool rotates in the counter-clockwise direction.

2. The hydraulic circuit of claim 1, wherein the rotary actuator is configured to enable 360° rotation of the spool to any given position to (i) align the subset of the respective plurality of openings of the spool with the subset of the plurality of openings of the sleeve, and (ii) change a degree of alignment between the subset of the respective plurality of openings of the spool and the subset of the plurality of openings of the sleeve so as to meter fluid passing through aligned openings and power the hydraulic actuator for movement in a given direction.

3. The hydraulic circuit of claim 1, wherein the rotary actuator coupled to the spool is configured to rotate the spool within the sleeve in the clockwise or the counter-clockwise direction to cause at least the partial alignment between the subset of the respective plurality of openings of the spool and the subset of the plurality of openings of the sleeve so as to connect both the first chamber and the second chamber of the hydraulic actuator to the supply line.

4. The hydraulic circuit of claim 1, wherein the spool includes an internal chamber, and wherein fluid passes through a given opening of the respective plurality of openings of the spool through the internal chamber to the second opening of the plurality of openings of the sleeve to the return line.

5. The hydraulic circuit of claim 4, wherein at least one of the respective plurality of openings of the spool is not a through-hole and does not reach the internal chamber of the spool.

6. The hydraulic circuit of claim 1, wherein each of the respective openings of the spool has corresponding openings arranged in a circular array about a longitudinal axis of the spool.

7. A method comprising:
receiving at a controller a command to move a hydraulic actuator in a given direction at a given speed, wherein the hydraulic actuator includes a first chamber and a second chamber; and
in response to the command, the controller providing a signal to a valve to operate the valve, wherein the valve comprises:
a sleeve having a plurality of openings configured along a length of the sleeve, wherein the plurality of openings includes at least: a first opening configured to receive pressurized fluid from a supply line, a second opening configured to communicate fluid to a return line including fluid having pressure lower than that of the pressurized fluid, a third opening configured to communicate fluid to and from the first chamber of the hydraulic actuator, and a fourth opening configured to communicate fluid to and from the second chamber of the hydraulic actuator;

a spool rotatable within the sleeve, the spool including a respective plurality of openings along a length of the spool corresponding to the plurality of openings of the sleeve; and a rotary actuator coupled to the spool for rotating the spool within the sleeve, wherein the rotary actuator operates to rotate the spool, based on the signal, to a given rotary position in a clockwise or a counter-clockwise direction to cause at least a partial alignment between a subset of the respective plurality of openings of the spool and a subset of the plurality of openings of the sleeve so as to: (i) connect one of the first chamber and the second chamber of the hydraulic actuator to the supply line, and connect the other chamber to the return line, or (ii) connect both the first chamber and the second chamber of the hydraulic actuator to the return line, wherein rotation of the spool to reach the given rotary position takes a first amount of time if the spool rotates in the clockwise direction and takes a second amount of time different from the first amount of time if the spool rotates in the counter-clockwise direction.

8. The method of claim 7, further comprising:

determining a required degree of alignment between a subset of the respective plurality of openings of the spool and a subset of the plurality of openings of the sleeve so as to meter fluid passing through aligned openings and power the hydraulic actuator for movement in the given direction at the given speed, wherein providing the signal comprises:

providing the signal to cause the rotary actuator to rotate the spool to the given rotary position that achieves the determined required degree of alignment.

9. The method of claim 7, further comprising:

determining one or more parameters including pressure of fluid in the supply line, pressure of fluid in the return line, position of the hydraulic actuator, force exerted by the hydraulic actuator, and speed of the hydraulic actuator;

determining mode of operation, wherein determining the mode of operation comprises determining whether to (i) connect one of the first chamber and the second chamber of the hydraulic actuator to the supply line, and connect the other chamber to the return line, or (ii) connect both the first chamber and the second chamber of the hydraulic actuator to either the supply line or the return line; and determining a rotary position of the spool based on the determined mode of operation, the command, and the one or more parameters, wherein providing the signal to the valve is based on the determined rotary position of the spool.

10. The method of claim 7, further comprising:

obtaining response time information indicative of a threshold amount of time between receiving the command and the hydraulic actuator beginning to move; and the controller determining whether to cause the spool to rotate in the clockwise direction or the counter-clockwise direction based on the response time information.

11. The method of claim 10, wherein the response time information is based on characteristics of the hydraulic actuator.

12. The method of claim 7, wherein the spool includes an internal chamber, and wherein fluid passes through a given opening of the respective plurality of openings of the spool through the internal chamber to the second opening of the plurality of openings of the sleeve to the return line.

13. The method of claim 12, wherein at least one of the respective plurality of openings of the spool is not a through-hole and does not reach the internal chamber of the spool.

14. A valve system comprising:

a sleeve having a plurality of openings configured along a length of the sleeve, wherein the plurality of openings includes at least: a first opening configured to communicate pressurized fluid from a supply port, a second opening configured to communicate fluid to a return port, a third opening configured to communicate fluid to and from a first chamber of a hydraulic actuator, and a fourth opening configured to communicate fluid to and from a second chamber of the hydraulic actuator;

a spool rotatable within the sleeve, the spool including a respective plurality of openings along a length of the spool corresponding to the plurality of openings of the sleeve;

a rotary actuator coupled to the spool for rotating the spool within the sleeve; and a controller for providing a signal to the rotary actuator to rotate the spool to a given rotary position in a clockwise or a counter-clockwise direction to cause at least a partial alignment between a subset of the respective plurality of openings of the spool and a subset of the plurality of openings of the sleeve so as to: (i) connect one of the first chamber and the second chamber of the hydraulic actuator to the supply port, and connect the other chamber to the return line, or (ii) connect both the first chamber and the second chamber of the hydraulic actuator to the return port, wherein rotation of the spool to reach the given rotary position takes a first amount of time if the spool rotates in the clockwise direction and takes a second amount of time different from the first amount of time if the spool rotates in the counter-clockwise direction.

15. The valve system of claim 14, wherein the rotary actuator is configured to enable 360° rotation of the spool to any given position to (i) align the subset of the respective plurality of openings of the spool with the subset of the plurality of openings of the sleeve, and (ii) change a degree of alignment between the subset of the respective plurality of openings of the spool and the subset of the plurality of openings of the sleeve so as to meter fluid passing through aligned openings and power the hydraulic actuator for movement in a given direction.

16. The valve system of claim 14, further comprising a rotary position sensor for providing to the controller information indicative of a rotary position of the spool within the sleeve.

17. The valve system of claim 14, wherein the spool includes an internal chamber communicating with the second opening of the plurality of openings of the sleeve, and selectively communicating fluid through a given opening of the respective plurality of openings of the spool to the third opening or the fourth opening of the sleeve.

18. The valve system of claim 17, wherein at least one of the respective plurality of openings of the spool is not a through-hole and does not reach the internal chamber of the spool.

19. The valve system of claim 14, wherein the controller further
- receives a command to move the hydraulic actuator in a given direction at a given speed;
- determines a required degree of alignment between a subset of the respective plurality of openings of the spool and a subset of the plurality of openings of the sleeve so as to meter fluid passing through aligned openings and power the hydraulic actuator for movement in the given direction at the given speed; and
- provides the signal based on the determined required degree of alignment.

\* \* \* \* \*